US012786936B2

(12) United States Patent

Zhang et al.

(10) Patent No.: US 12,786,936 B2

(45) Date of Patent: Nov. 3, 2026

(54) METHOD FOR DETERMINING RELATIVE POSITION, COMMUNICATION DEVICE, STORAGE MEDIUM, AND WIRELESS COMMUNICATION SYSTEM

(71) Applicant: Beijing X-Ring Technology Co., Ltd., Beijing (CN)

(72) Inventors: Yafan Zhang, Shanghai (CN); Xinzheng Wang, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 269 days.

(21) Appl. No.: 18/652,460

(22) Filed: May 1, 2024

(65) Prior Publication Data

US 2025/0113326 A1 Apr. 3, 2025

(30) Foreign Application Priority Data

Sep. 28, 2023 (CN) ......................... 202311283500.6

(51) Int. Cl.

*H04W 64/00* (2009.01)

*G01S 5/02* (2010.01)

(52) U.S. Cl.

CPC ........... *H04W 64/00* (2013.01); *G01S 5/0284* (2013.01)

(58) Field of Classification Search

CPC ........ H04W 64/00; G01S 5/0284; G01S 5/12; G01S 5/0218; G01S 5/0205; G01S 11/02

See application file for complete search history.

(56) References Cited

U.S. PATENT DOCUMENTS

2016/0286519 A1 9/2016 Tzur
2020/0213160 A1 7/2020 Doostnejad et al.
2020/0213971 A1 7/2020 Ayyalasomayajula et al.
2021/0266212 A1* 8/2021 Chae .......................... G01S 5/06
2022/0196778 A1* 6/2022 Kobzantsev .............. G01S 3/74
2023/0132850 A1* 5/2023 Liu ....................... G01S 13/003
342/58

OTHER PUBLICATIONS

European patent application No. 24173896.2, Search Report dated Oct. 23, 2024, 9 pages.

* cited by examiner

*Primary Examiner* — Mazda Sabouri

(74) *Attorney, Agent, or Firm* — Cozen O'Connor

(57) ABSTRACT

A communication device, a storage medium, and a wireless communication system are operable to implement method for determining a relative position. The method is performed by a first wireless communication device, the first wireless communication device includes two or more antennas, and the method includes: determining a relative position of the second wireless communication device according to a phase difference between a subcarrier received by each of the two or more antennas, in which the subcarrier is configured to carry a signal sent by the second wireless communication device, and the subcarrier is at least one a plurality of subcarriers.

14 Claims, 11 Drawing Sheets

METHOD FOR DETERMINING RELATIVE POSITION, COMMUNICATION DEVICE, STORAGE MEDIUM, AND WIRELESS COMMUNICATION SYSTEM

CROSS-REFERENCE TO RELATED APPLICATION

This application is based on and claims priority to Chinese Patent Application No. 202311283500.6 filed on Sep. 28, 2023, the entire contents of which are incorporated herein by reference for all purposes.

BACKGROUND

For current wireless communication devices, it needs manual configuration in an interface by a user or a proprietary action applied to the device by the user or a special hardware design or a peripheral supporting design to complete relative position determination between the wireless communication devices, and thus there are problems such as an inconvenient user implementation, a poor user experience, a high deployment cost, and a limited application scenario.

SUMMARY

The present disclosure relates to the field of communications, more particularly to a method for determining a relative position, a communication device, a storage medium, and a wireless communication system.

Embodiments of a first aspect of the present disclosure propose a method for determining a relative position, the method is performed by a first wireless communication device, the first wireless communication device includes two or more antennas, and the method includes: determining a relative position of a second wireless communication device according to a phase difference between the same subcarriers received by the two or more antennas, in which the subcarrier is configured to carry a signal sent by the second wireless communication device, and a plurality of subcarriers are provided.

Embodiments of a second aspect of the present disclosure propose an apparatus for determining a relative position, and the apparatus is arranged on a first wireless communication device, and includes: a determining module configured to determine a relative position of a second wireless communication device according to a phase difference between the same subcarriers received by two or more antennas, in which the subcarrier is configured to carry a signal sent by the second wireless communication device, and a plurality of subcarriers are provided.

Embodiments of a third aspect of the present disclosure propose a communication device, which includes: a transceiver; a memory; and a processor connected with the transceiver and the memory respectively, configured to control wireless signal transmission and reception of the transceiver by executing computer-executable instructions on the memory, and capable of realizing the method described in the embodiments of the first aspect of the present disclosure.

Embodiments of a fourth aspect of the present disclosure propose a non-transitory computer-readable storage medium stored with computer instructions, in which the computer instructions are configured to cause a computer to perform the method described in the embodiments of the first aspect of the present disclosure.

Embodiments of a fifth aspect of the present disclosure propose a wireless communication system, which includes a first wireless communication device and a second wireless communication device, in which the first wireless communication device is configured to perform the method described in the embodiments of the first aspect of the present disclosure.

It should be understood that both the forgoing general descriptions and the following detailed descriptions are exemplary and explanatory only, and are not restrictive of the present disclosure.

BRIEF DESCRIPTION OF THE DRAWINGS

The drawings herein are incorporated into the specification and form a part of the specification, show embodiments that comply with the present disclosure, are used to explain the principles of the present disclosure together with the specification, and do not constitute improper limitations on the present disclosure.

DETAILED DESCRIPTION

Figure 1:
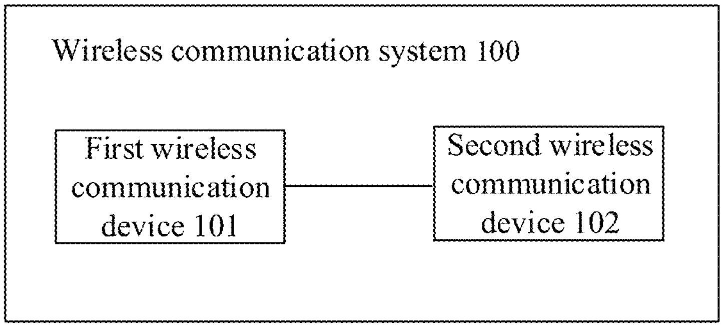
FIG. 1 is a schematic diagram of a wireless communication system according to an embodiment of the present disclosure.

Embodiments of the present disclosure are described in detail below, examples of which are shown in the accompanying drawings, in which the same or similar numbers from beginning to end indicate the same or similar elements or elements having the same or similar functions. The following embodiments described with reference to the accompanying drawing are illustrative. It should be understood that the embodiments described are intended to explain the present disclosure, but not to limit the present disclosure.

In order to facilitate the understanding of the solution of the present disclosure, the related art involved in the present disclosure is described below.

When an existing product is operated on a plurality of screens, a user needs to manually perform the following operations to indicate left and right screens: the user needs to manually configure a relative position between two devices in an interface, and if the position between the two devices changes, the user needs to perform the manual setting again, thus resulting in a poor user experience; and, the user also needs to apply a proprietary action to the device in a special direction, which is inconvenient to operate and results in the poor user experience.

At present, the general methods for determining the relative position between the wireless communication devices further include: Angle of Arrival (AoA)/Angle of Departure (AoD) positioning, Wireless Local Area Network (WLAN) and Channel State Information (CSI) positioning, and measurement-assisted positioning via a server or a plurality of wireless access points, etc.

However, the AoA/AoD positioning requires a special hardware design or a peripheral supporting design, which has a high cost, and cannot be realized on the stock of WLAN wireless devices through software upgrades. For example, the AoA/AoD positioning needs an antenna array, has requirements for antenna spacing, has a high design cost, and cannot be used on traditional terminals. The WLAN CSI positioning requires an antenna array with 3 or more antennas, which is difficult for mobile phones and routers, and cannot be realized on the stock of WLAN wireless devices through software upgrades. A mutually assisted positioning through a plurality of servers or a plurality of wireless access points such as routers has a high deployment cost and a limited application scenario.

Accordingly, the present disclosure proposes a method for determining a relative position, and only by upgrading application software, the position determination between two or more devices can be automatically completed through the existing wireless communication interface and antenna design in the traditional wireless communication device, without modifying the hardware design and modifying the hardware and firmware, thus improving the user experience. After the relative position between the wireless communication devices is determined in the method of the present disclosure, it can be automatically displayed on the screen without manual setting, thus greatly improving the user experience.

In order to better understand the solution of the embodiments of the present disclosure, a wireless communication system applicable to the embodiments of the present disclosure is described below. FIG. 1 is a schematic diagram of a communication system according to an embodiment of the present disclosure. As shown in FIG. 1, the communication system 100 may include a first wireless communication device 101 and a second wireless communication device 102.

In some embodiments, the first wireless communication device 101 and the second wireless communication device 102 mainly include a communication device that supports a WLAN or WIFI (Wireless Fidelity) technology, as well as a communication device that supports a close range wireless communication technology such as Bluetooth or Long Range Radio (LoRa), and a cellular wireless communication technology such as fourth/fifth generation mobile communication technologies (4G/5G), etc.

In some embodiments, the first wireless communication device 101 and the second wireless communication device 102 include at least one of, for example, a mobile phone, a wearable device, an Internet of Things device, a vehicle with a wireless communication function, an intelligent vehicle, a tablet computer (Pad), a computer with wireless sending and receiving functions, a virtual reality (VR) terminal, an augmented reality (AR) terminal, a wireless terminal in industrial control, a wireless terminal in self-driving, a wireless terminal in remote medical surgery, a wireless terminal in smart grid, a wireless terminal in transportation safety, a wireless terminal in smart city, or a wireless terminal in smart home, which are not limited to this.

In some embodiments, the first wireless communication device 101 and the second wireless communication device 102 are devices of a wireless access point (AP)/a STA site that support arbitrary sounding process according to WiFi4 802.11n/WiFi5 802.11ac/WiFi6 802.11ax protocol.

In some embodiments, a combination of the first wireless communication device 101 and the second wireless communication device 102 may be: AP/soft access point (SoftAP)+STA or STA+AP/SoftAP.

In some embodiments, the first wireless communication device 101 includes two or more antennas. The number of antennas of the second wireless communication device 102 is not limited in the present disclosure, and the second wireless communication device 102 may include one or more antennas.

It can be understood that the wireless communication system described in the embodiments of the present disclosure is intended to provide a clearer explanation of the technical solution of the embodiments of the present disclosure, and does not constitute limitations on the technical solution proposed in the embodiments of the present disclosure. Those skilled in the art can know that with the evolution of the system architecture and the emergence of new business scenarios, the technical solution proposed in the embodiments of the present disclosure is also applicable to similar technical problems.

The following embodiments of the present disclosure may be applied to the wireless communication system 100 shown in FIG. 1, or a part of bodies thereof, but are not limited to this. Each body shown in FIG. 1 is illustrative. The communication system may include all or part of the bodies in FIG. 1 and also other bodies other than those shown in FIG. 1, and the number and form of each body may be arbitrary.

A method and an apparatus for determining a relative position, a device, and a storage medium according to embodiments of the present disclosure are described in detail below with reference to the accompanying drawing.

Figure 2:
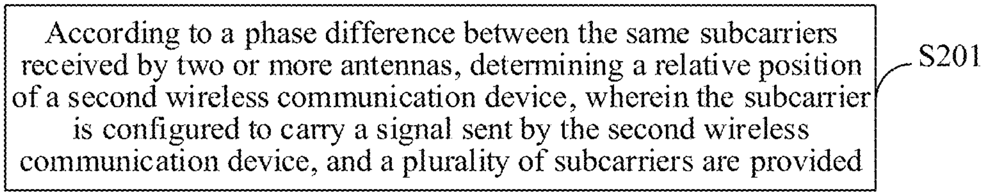
FIG. 2 is a flow chart of a method for determining a relative position according to an embodiment of the present disclosure.

FIG. 2 is a flow chart of a method for determining a relative position according to an embodiment of the present disclosure, this method is performed by the first wireless communication device 101, and as shown in FIG. 2, the method for determining the relative position includes the following steps.

In step 201, determining a relative position of the second wireless communication device 102 according to a phase difference between the same subcarriers received by two or more antennas, in which the subcarrier is configured to carry a signal sent by the second wireless communication device 102, and a plurality of subcarriers are provided.

In some embodiments of the present disclosure, the first wireless communication device 101 includes two or more antennas, the first wireless communication device 101 uses the two or more antennas to receive the signal sent by the second wireless communication device 102, and the signal is carried by the plurality of subcarriers.

In some embodiments of the present disclosure, the plurality of subcarriers are provided, and the phase difference between the same subcarriers received by the two or more antennas is determined, so that a plurality of phase differences are obtained.

For example, the first wireless communication device 101 includes two antennas, namely antenna 1 and antenna 2, the plurality of subcarriers include subcarrier 1 and subcarrier 2, and determining the phase difference between the same subcarriers received by two or more antennas includes determining a phase difference between the subcarriers 1 received by the antenna 1 and the antenna 2, and determining a phase difference between the subcarriers 2 received by the antenna 1 and the antenna 2.

In some embodiments of the present disclosure, when the first wireless communication device 101 includes more than two antennas, it is necessary to determine the phase difference between the same subcarriers received by the more than two antennas, and the phase difference of the same subcarriers received between every two antennas can be determined sequentially to obtain the plurality of phase differences.

For example, the first wireless communication device 101 includes three antennas, namely antenna 1, antenna 2 and antenna 3, and the phase difference of the same subcarriers received between the antenna 1 and the antenna 2, the phase difference of the same subcarriers received between the antenna 2 and the antenna 3, and the phase difference of the same subcarriers received between the antenna 1 and the antenna 3 are determined sequentially.

In some embodiments of the present disclosure, the relative position of the second wireless communication device 102 refers to a position of the second wireless communication device 102 relative to the first wireless communication device 101.

In some embodiments of the present disclosure, after the first wireless communication device 101 determines the relative position of the second wireless communication device 102, the method further includes: displaying the relative position of the second wireless communication device 102 on a screen.

In some embodiments of the present disclosure, after the first wireless communication device 101 determines the relative position of the second wireless communication device 102, the method further includes: sending the relative position of the second wireless communication device 102 to the second wireless communication device 102.

In summary, according to the method for determining the relative position proposed in the present disclosure, the method is performed by the first wireless communication device 101, and the method includes: determining the relative position of the second wireless communication device 102 according to the phase difference between the same subcarriers received by the two or more antennas, in which the subcarrier is configured to carry the signal sent by the second wireless communication device 102, and the plurality of subcarriers are provided. The method of the present disclosure determines the relative position according to the phase differences of the same carriers received by the antennas, and the position determination between the wireless communication devices can be completed without modification of the hardware design. Therefore, the method has a low cost and wide application scenarios, and there is no need for the user to manually set, thus improving the user experience.

Figure 3:
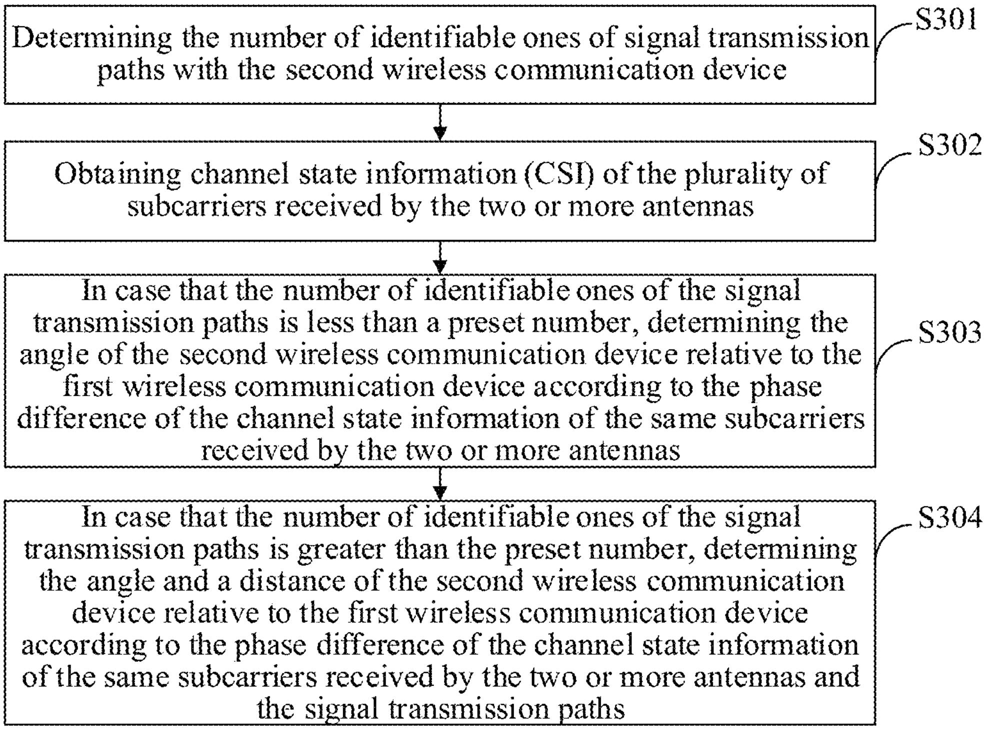
FIG. 3 is a flow chart of a method for determining a relative position according to an embodiment of the present disclosure.

Based on the embodiment shown in FIG. 2, FIG. 3 further shows a flow chart of a method for determining a relative position according to the present disclosure, which is performed by the first wireless communication device 101.

Figure 4:
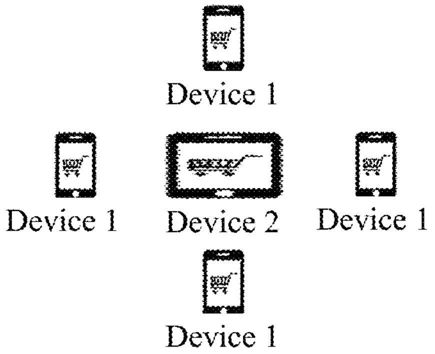
FIG. 4 is an application scenario diagram of a method for determining a relative position according to an embodiment of the present disclosure.

In some embodiments of the present disclosure, FIG. 4 is a diagram of an application scenario of a method for determining a relative position according to the present disclosure. As shown in FIG. 4, device 1 is the first wireless communication device 101, one or more devices 1 may be provided, and the device 1 may be a wireless access point, a soft wireless access point or a STA site; and, device 2 is the second wireless communication device 102, and one or more may be provided. When the device 1 is the wireless access point or the soft wireless access point, the device 2 is the STA site, and the device 1 is an access point of a wireless network of the device 2; and, when the device 1 is the STA site, the device 2 is the wireless access point or the soft wireless access point, and the device 2 is an access point of a wireless network of the device 1.

As shown in FIG. 3, the method includes the following steps.

In step 301, the number of identifiable ones of the signal transmission paths with the second wireless communication device 102 is determined.

In some embodiments of the present disclosure, the number of identifiable ones of the signal transmission paths with the second wireless communication device 102 is firstly determined, and in a scenario where the number of identifiable ones of the signal transmission paths is different, a relative position of the second wireless communication device 102 is determined according to a phase difference between the same subcarriers received by two or more antennas.

In some embodiments of the present disclosure, determining the number of identifiable ones of the signal transmission paths with the second wireless communication device 102 includes: obtaining a path spacing between any two signal transmission paths with the second wireless communication device 102, and determining that the two signal transmission paths are identifiable in case that the path spacing is greater than or equal to a preset threshold, thereby counting the number of identifiable ones of the signal transmission paths with the second wireless communication device 102.

Figure 5:
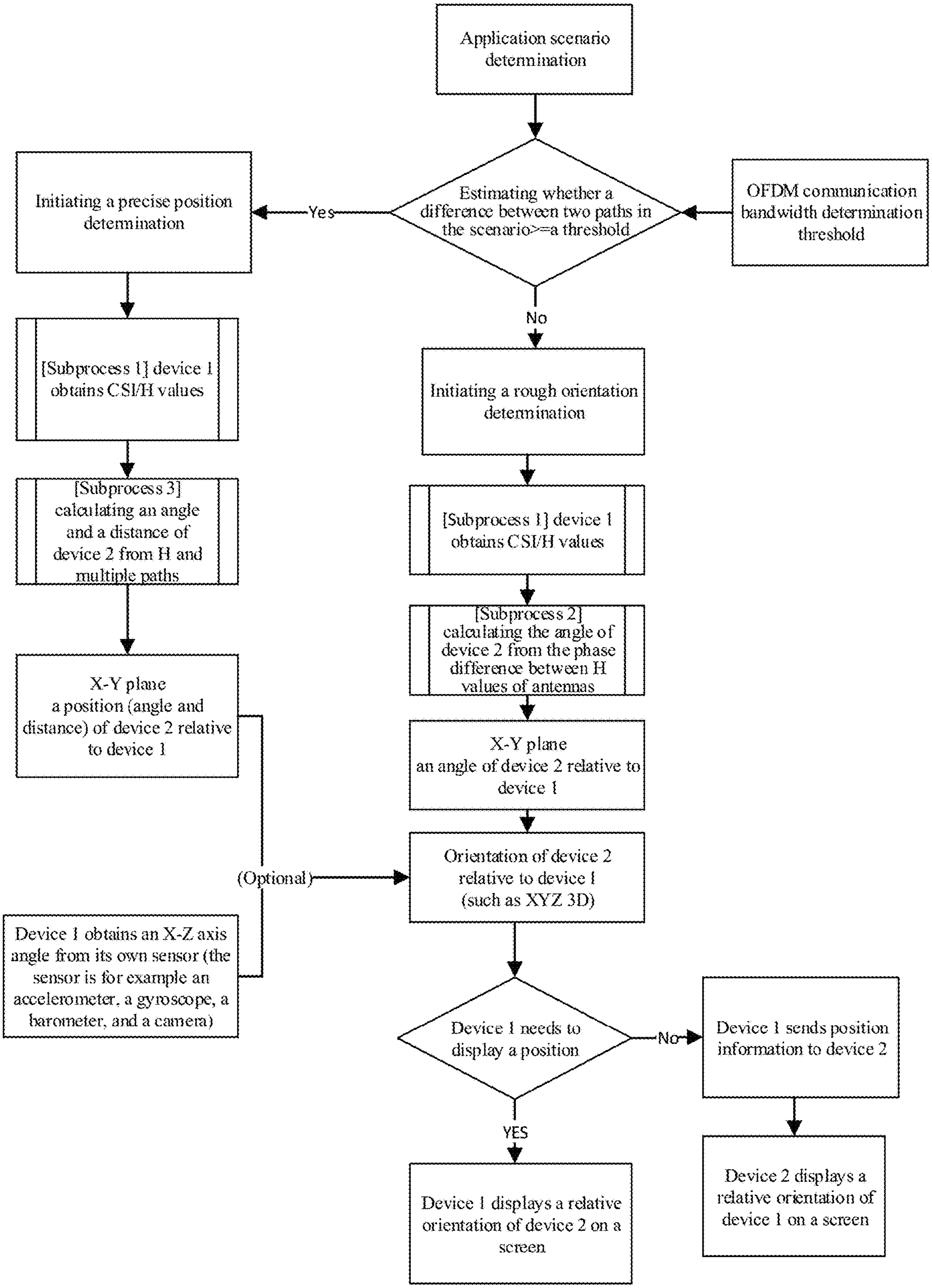
FIG. 5 is an example flow chart of a method for determining a relative position according to an embodiment of the present disclosure.

In some embodiments, as shown in FIG. 5, it is estimated whether a difference between two paths in the scenario is greater than or equal to the preset threshold, in which the two paths include any two signal transmission paths, for example, they may be a direct path and a reflection path.

In some embodiments, the preset threshold is related to an interaction bandwidth between the first wireless communication device 101 and the second wireless communication device 102, for example, when the interaction broadband BW=320 MHz=3.2*10^8 Hz, the preset threshold is C/BW=0.9375 meters, and in case that the path spacing between the two signal transmission paths is greater than or equal to 0.9375 meters, the two signal transmission paths can be identified.

In some embodiments, determining the number of identifiable ones of the signal transmission paths with the second wireless communication device 102 includes: obtaining time-frequency peaks of a plurality of signal transmission paths with the second wireless communication device 102, and determining the number of ones of the time-frequency peaks of the plurality of signal transmission paths, which are greater than the preset threshold, as the number of identifiable ones of the signal transmission paths.

In step 302, channel state information (CSI) of a plurality of subcarriers received by two or more antennas is obtained.

In some embodiments, the method further includes: judging whether the first wireless communication device 101 and the second wireless communication device 102 support a WLAN sounding frame interaction, respectively.

Figure 6:
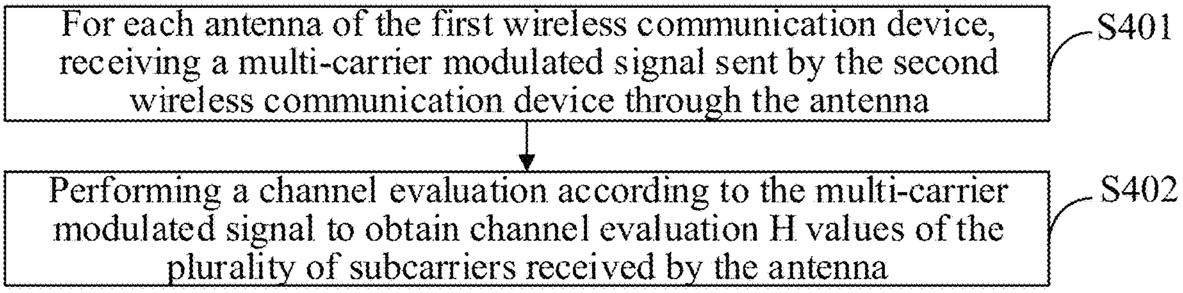
FIG. 6 is a flow chart of a method for determining a relative position according to an embodiment of the present disclosure.

In some embodiments of the present disclosure, the first wireless communication device 101 and/or the second wireless communication device 102 do not support the sounding frame interaction, as shown in FIG. 6, and the implementation of step 302 includes the following step 401 and step 402.

In step 401, for each antenna of the first wireless communication device 101, a multi-carrier modulated signal sent by the second wireless communication device is received through the antenna.

In some embodiments, the multi-carrier modulated signal, such as an orthogonal frequency division multiplexing (OFDM) modulated signal, may also include other multi-carrier modulated signals.

In some embodiments, in case that the first wireless communication device 101 includes the antenna 1 and the antenna 2, and the second wireless communication device 102 sends a WLAN OFDM frame, the first wireless communication device 101 receives the WLAN OFDM frame sent by the second wireless communication device 102 through the antenna 1 and the antenna 2, respectively.

In step 402, a channel evaluation is performed according to the multi-carrier modulated signal to obtain channel evaluation H values of the plurality of subcarriers received by the antenna.

In some embodiments, the channel evaluation H value is configured to describe the attenuation of the subcarrier during the transmission of the OFDM signal.

In some embodiments, in case that the first wireless communication device 101 includes the antenna 1 and the antenna 2, the first wireless communication device 101 performs a channel estimation on the WLAN OFDM frames received by the antenna 1 and the antenna 2 respectively, and the H value of each subcarrier of OFDM received by the antenna 1 and the H value of each subcarrier of OFDM received by the antenna 2 are obtained.

Figure 7:
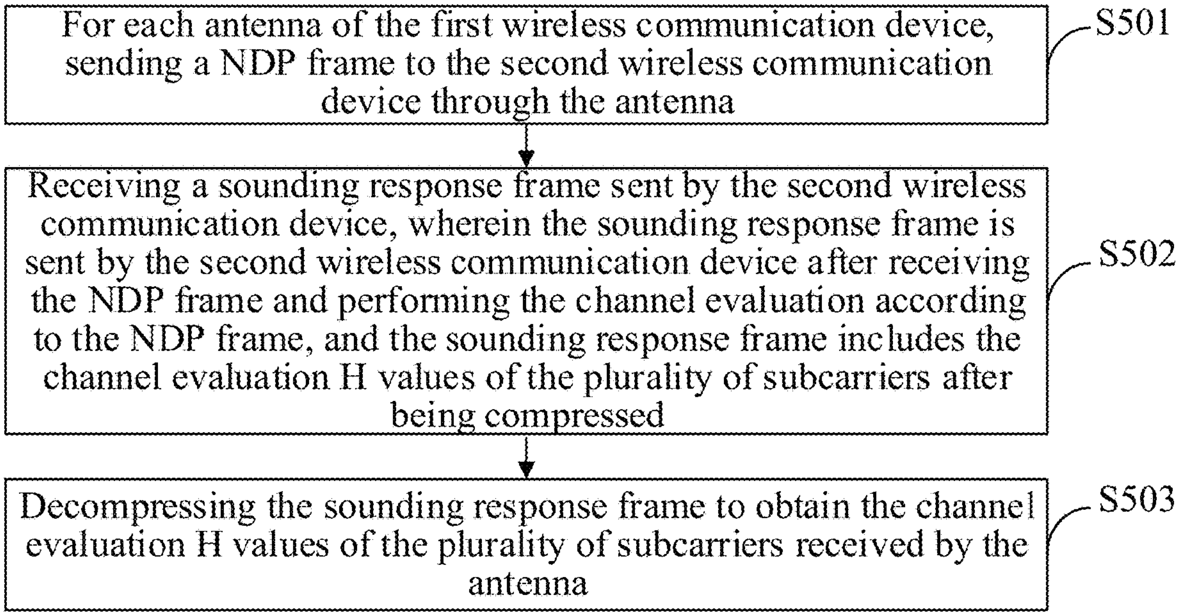
FIG. 7 is a flow chart of a method for determining a relative position according to an embodiment of the present disclosure.

In some embodiments of the present disclosure, the first wireless communication device and the second wireless communication device support the sounding frame interaction, as shown in FIG. 7, and the implementation of step 302 includes the following step 501 to step 503.

In step 501, for each antenna of the first wireless communication device 101, a NDP frame is sent to the second wireless communication device 102 through the antenna.

In some embodiments, the first wireless communication device 101 and the second wireless communication device 102 support the sounding response frame interaction, and in the traditional sounding process, a process from an null data packet announcement (NDPA) frame to a null data packet (NDP) frame to channel information including compressed beamforming is included, in which the NDP frame is configured for packet starting detection, channel estimation and time synchronization, etc., the NDPA frame is configured to announce the device that needs to feedback the channel information, the compression beamforming is configured to assist in beamforming, and the H value of each subcarrier of OFDM is obtained during the compression beamforming.

In some embodiments, in case that the first wireless communication device 101 includes the antenna 1 and the antenna 2, and the first wireless communication device 101 sends the NDP frame to the second wireless communication device 102 through the antenna 1 and the antenna 2, respectively.

In step 502, the sounding response frame sent by the second wireless communication device 102 is received, in which the sounding response frame is sent by the second wireless communication device 102 after receiving the NDP frame and performing the channel evaluation according to the NDP frame, and the sounding response frame includes the channel evaluation H values of the plurality of subcarriers after being compressed.

In some embodiments, the second wireless communication device 102, after receiving the NDP frame, performs the channel evaluation according to the NDP frame to obtain the H value of each subcarrier of OFDM, compresses the H value and performs the sounding response frame feedback.

In some embodiments, in case that the first wireless communication device 101 includes the antenna 1 and the antenna 2, the first wireless communication device 101 sends the NDP frame to the second wireless communication device 102 through the antenna 1 and the antenna 2, respectively. The second wireless communication device 102 performs the channel evaluation according to the NDP frame sent by the antenna 1, to obtain the H value of each subcarrier of OFDM received by the antenna 1, compress the H value and feed it back to the first wireless communication device 101 through the sounding response frame. The second wireless communication device 102 performs the channel evaluation according to the NDP frame of the antenna interaction between the antenna 2 and the second wireless communication device 102, to obtain the H value of each subcarrier of OFDM received by the antenna 2, compress the H value and feed it back to the first wireless communication device 101 through the sounding response frame.

In step 503, the sounding response frame is decompressed to obtain the channel evaluation H values of the plurality of subcarriers received by the antenna.

In some embodiments, in case that the first wireless communication device 101 includes the antenna 1 and the antenna 2, the sounding response frame of the antenna interaction between the antenna 1 of the first wireless communication device 101 and the second wireless communication device 102 is decompressed to obtain the H value of each subcarrier of OFDM received by the antenna 1; and the sounding response frame of the antenna interaction between the antenna 2 of the first wireless communication device 101 and the second wireless communication device 102 is decompressed to obtain the H value of each subcarrier of OFDM received by the antenna 2.

In some embodiments of the present disclosure, the method further includes: judging whether an angle of the first wireless communication device 101 on a plane of an X axis and a Z axis is zero; in case that the angle of the first wireless communication device 101 on the plane of the X axis and the Z axis is not zero, correcting the channel evaluation H value of each subcarrier according to the angle of the first wireless communication device on the plane of the X axis and the Z axis.

In other words, in case that a horizontal plane is the plane of the X axis and the Y axis, it can be determined whether the first wireless communication device 101 is horizontally placed through judging whether the angle of the first wireless communication device 101 on the plane of the X axis and the Z axis is zero. In case that the angle of the first wireless communication device on the plane of the X axis and the Z axis is not zero, the first wireless communication device 101 is considered not to be placed horizontally, and the channel evaluation H value of each subcarrier is corrected according to the angle of the first wireless communication device on the plane of the X axis and the Z axis, for example, H value=uncorrected H*Z axis angle.

Figure 8:
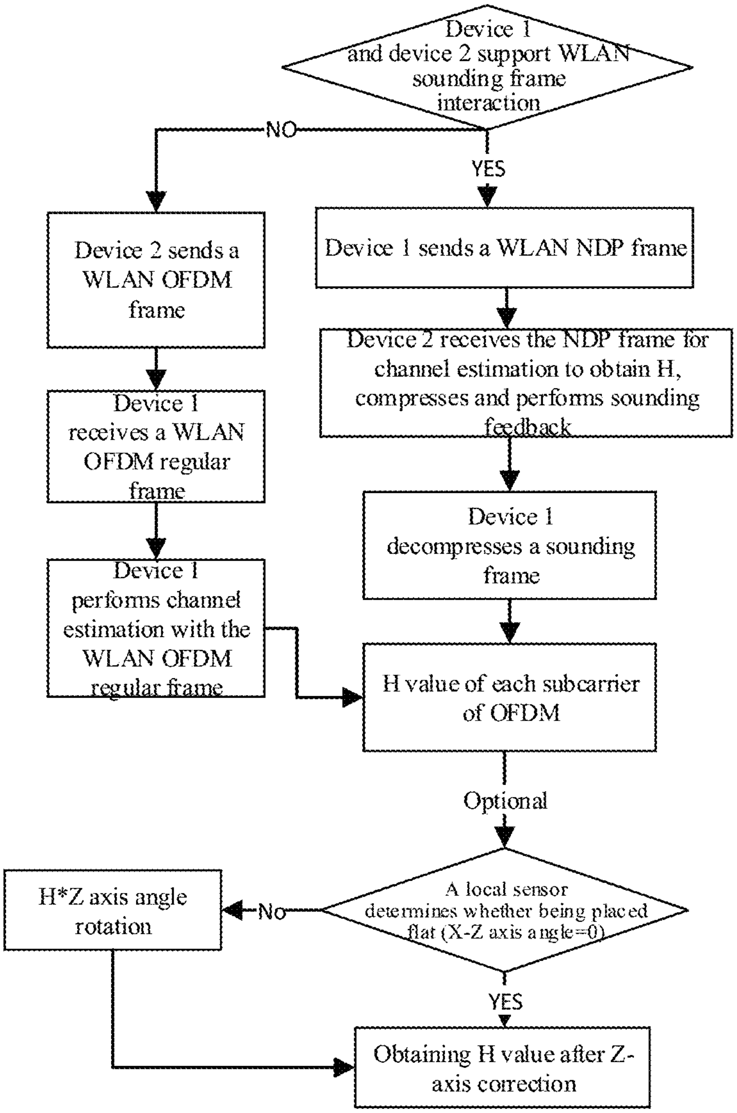
FIG. 8 is an example flow chart of a method for determining a relative position according to an embodiment of the present disclosure.

In some embodiments of the present disclosure, as shown in FIG. 8, it is determined whether the angle of the first wireless communication device 101 on the plane of the X axis and the Z axis is zero according to a sensor build-in the first wireless communication device 101.

In step 303, in case that the number of identifiable ones of the signal transmission paths is less than a preset number, according to the phase difference of the channel state information of the same subcarriers received by the two or more antennas, an angle of the second wireless communication device relative to the first wireless communication device is determined.

In some embodiments of the present disclosure, in case that the number of identifiable ones of the signal transmission paths is less than the preset number, that is, a signal transmission distance between the device 1 and the device 2 is small, a length difference of the plurality of signal transmission paths is small, for example, being less than a first preset distance (such as 1 meter), the direct path and the reflection path have a too small difference to be distinguished, the plurality of paths cannot be identified, and there is no need to consider multipath fading, i.e. the fading caused by the multipath effect. Accordingly, as shown in FIG. 5, a rough orientation determination is initiated, and the angle of the second wireless communication device 102 relative to the first wireless communication device 101 is determined according to the phase difference of the channel state information of the same subcarriers received by the two or more antennas of the first wireless communication device 101.

Figure 10:
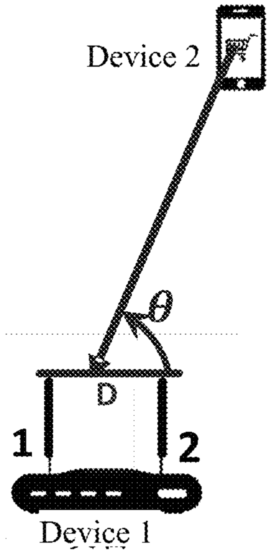
FIG. 10 is an example diagram of a method for determining a relative position according to an embodiment of the present disclosure.

In a scenario of the present disclosure, as shown in FIG. 10, the device 1 is the first wireless communication device 101, the device 1 includes the antenna 1 and the antenna 2, the direct path and the reflection path between the device 1 and the device 2 have a too small difference to be distinguished, there is one identifiable signal transmission path, and an angle of arrival of the signal transmission path is θ.

In some embodiments of the present disclosure, the first wireless communication device 101 is horizontally placed around the second wireless communication device 102, for example, the first wireless communication device 101 is horizontally placed on front, rear, left and right sides of the second wireless communication device 102 at an interval of 90 degrees, a CSI/H value of each subcarrier of the antenna 1 and a CSI/H value of each subcarrier of the antenna 2 are obtained through step 302, and a phase difference between the CSI/H value of each subcarrier of the antenna 1 and the CSI/H value of each subcarrier of the antenna 2 is determined. For example, the subcarrier includes subcarrier 1 and subcarrier 2, a phase difference between the CSI/H value of the subcarrier 1 of the antenna 1 and the CSI/H value of the subcarrier 1 of the antenna 2 is determined, and a phase difference between the CSI/H value of the subcarrier 2 of the antenna 1 and the CSI/H value of the subcarrier 2 of the antenna 2 is determined.

Figure 11:
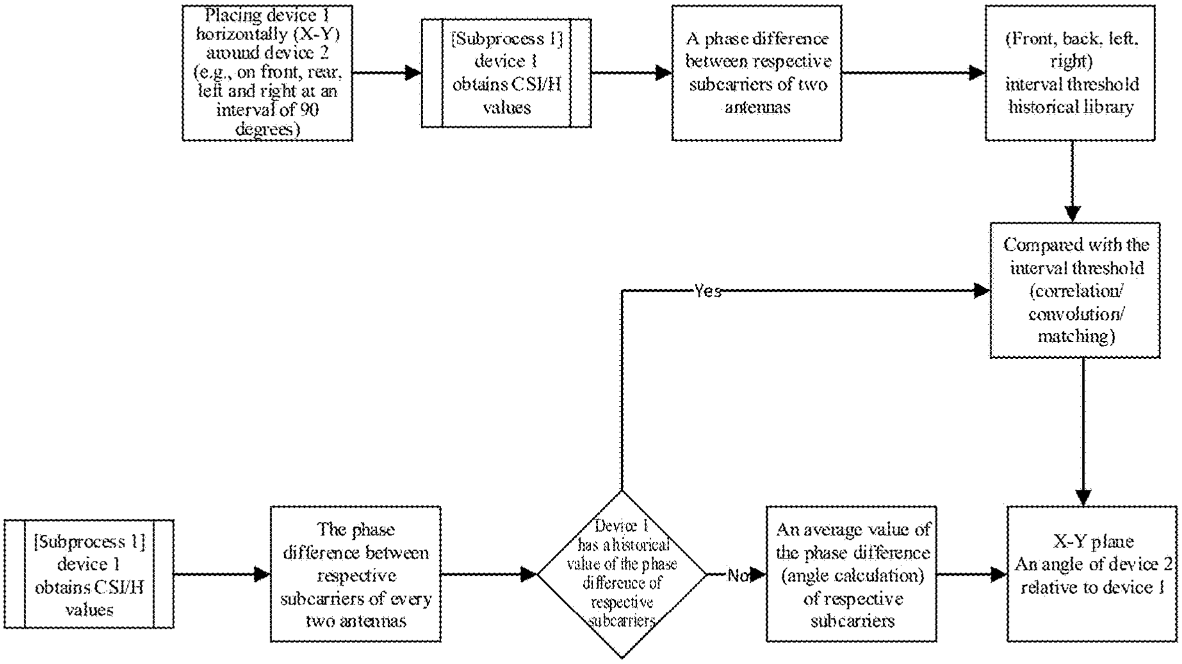
FIG. 11 is an example flow chart of a method for determining a relative position according to an embodiment of the present disclosure.

Further, as shown in FIG. 11, an interval threshold of the phase difference between each subcarrier of the antenna 1 and each subcarrier of the antenna 2 of the device 1 is obtained from a historical library, the phase difference between each subcarrier of the antenna 1 and each subcarrier of the antenna 2 of the device 1 is compared with the corresponding interval threshold, the comparison manner including correlation, convolution, matching operation, etc., and the angle of the second wireless communication device 102 relative to the first wireless communication device 101 is obtained. In case that the horizontal plane serves as the plane of the X axis and the Y axis, the angle of the second wireless communication device 102 in the plane of the X axis and the Y axis relative to the first wireless communication device 101 is obtained.

Figure 9:
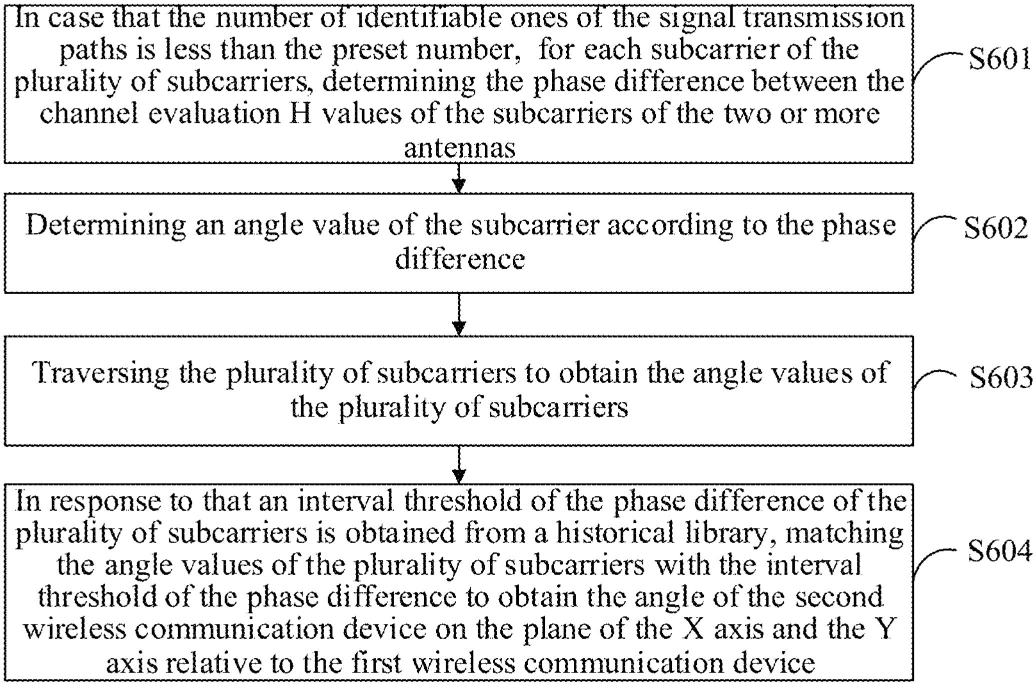
FIG. 9 is a flow chart of a method for determining a relative position according to an embodiment of the present disclosure.

In some embodiments of the present disclosure, as shown in FIG. 9, the implementation of step 303 includes the following step 601 to step 604.

In step 601, in case that the number of identifiable ones of the signal transmission paths is less than the preset number, for each subcarrier of the plurality of subcarriers, the phase difference between the channel evaluation H values of the subcarriers the two or more antennas is determined.

In some embodiments of the present disclosure, for the subcarrier 1 of the plurality of subcarriers, in case that the first wireless communication device 101 includes more than two antennas, and the phase difference between the H values of the subcarriers 1 of every two antennas is determine, respectively. For example, the first wireless communication device 101 includes the antenna 1, the antenna 2 and the antenna 3, and the phase difference between the H values of the subcarriers 1 of the antenna 1 and the antenna 2, the phase difference between the H values of the subcarriers 1 of the antenna 2 and the antenna 3, and the phase difference between the H values of the subcarriers 1 of the antenna 1 and the antenna 3 are determined, respectively.

For example, a formula for determining the phase difference between subcarriers j of antenna 0 and the antenna 1 is:

$$CPD = \measuredangle CSI_{0,j} - \measuredangle CSI_{1,j}.$$

$\angle CSI_{0,j}$ represents a CSI/H value of the subcarrier j received by the antenna 0, $\angle CSI_{1,j}$ represents a CSI/H value of the subcarrier j received by the antenna 1, and CPD, i.e., Phase Difference, represents a phase difference.

In step 602, according to the phase difference, an angle value of the subcarrier is determined.

In some embodiments, according to the phase difference, a specific formula for determining the angle value of the subcarrier is:

$$CPD = \left(2\pi\frac{d}{\lambda}\sin\theta\right)\mathrm{mod}2\pi.$$

CPD represents the phase difference, and θ represents the angle value of the subcarrier.

In step 603, the plurality of subcarriers is traversed to obtain the angle values of the plurality of subcarriers.

In some embodiments, in case that the callable subcarrier includes the subcarrier 1, the subcarrier 2 and subcarrier 3, for the subcarrier 1, the subcarrier 2 and the subcarrier 3, the phase difference between the H values of the subcarriers 1, the phase difference between the H values of the subcarriers 2 and the phase difference between the H values of the subcarriers 3 of the two or more antennas are determined respectively according to step 601, and then the angle value of the subcarrier 1, the angle value of the subcarrier 2 and the angle value of the subcarrier 3 are determined according to step 602.

In step 604, the angle values of the plurality of subcarriers are matched with the interval threshold of the phase difference to obtain the angle of the second wireless communication device 102 on the plane of the X axis and the Y axis relative to the first wireless communication device 101, in response to that the interval threshold of the phase difference of the plurality of subcarriers is obtained from the historical library.

In some embodiments, as shown in FIG. 11, it is determined whether the first wireless communication device 101 has a historical value of the phase difference of the subcarriers, and if so, the historical value of the phase difference of the subcarriers is obtained from the historical library to serve as the interval threshold of the phase difference.

Figure 12:
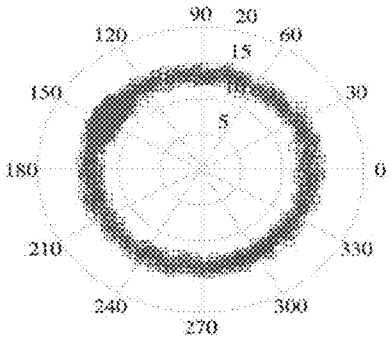
FIG. 12 is an example diagram of an interval threshold of a phase difference between two adjacent antennas according to an embodiment of the present disclosure.

It should be noted that a signal transmitting side sends frames continuously, and a phase difference value of two adjacent antennas on a receiving side is generally stable. As shown in FIG. 12, 960 frames are continuously sent, the phase difference of a certain subcarrier is mainly concentrated in a range of 130 degrees~170 degrees as can be seen in polar coordinates (X-Y plane), a phase value of a single antenna is random, and the range of 130 degrees~170 degrees is the interval threshold in this direction. In the same way, the first wireless communication device 101 includes two or more antennas, and the phase difference value of two adjacent antennas has the interval threshold.

Further, the phase difference between respective subcarriers of every two antennas is compared with the corresponding interval threshold, to obtain the angle of the second wireless communication device 102 on the plane of the X axis and the Y axis relative to the first wireless communication device 101. The comparison manner includes correlation, convolution, matching operations, etc.

In some embodiments, the angle of arrival (AOA) is calculated according to the phase difference obtained by comparison, and the AOA serves as the angle of the second wireless communication device 102 in the plane of the X axis and the Y axis relative to the first wireless communication 101 device, and a formula for calculating the AOA from the phase difference is as follows:

$$\theta_i = \arccos(\Delta\angle\hat{H}_i\lambda/(2\pi d)).$$

∠Hi represents the phase difference, d is a distance between the two adjacent antennas, and λ is a wavelength, preferably, d is set to 0.5, $\theta_i$ represents the angle value of the AOA, the phase difference corresponds to the angle value, and since the phase difference value obtained by comparison is stable, the calculated angle value of the AOA is also stable.

In some embodiments of the present disclosure, the method further includes: obtaining an average value of the angle values of the plurality of subcarriers, in response to that the interval threshold of the phase difference of the plurality of subcarriers is not obtained from the historical library; and determining the average value as the angle of the second wireless communication device 102 on the plane of the X axis and the Y axis relative to the first wireless communication device 101.

In some embodiments, as shown in FIG. 11, in case that the first wireless communication device 101 does not have the historical value of the phase difference of the subcarriers, the average value of the angle values corresponding to the phase differences of the subcarriers is obtained, and the average value serves as the angle of the second wireless communication device 102 on the plane of the X axis and the Y axis relative to the first wireless communication device 101.

In step 304, in case that the number of identifiable ones of the signal transmission paths is greater than the preset number, according to the phase difference of the channel state information of the same subcarriers received by the two or more antennas and the signal transmission paths, the angle and the distance of the second wireless communication device relative to the first wireless communication device are determined.

In some embodiments of the present disclosure, in case that the number of identifiable ones of the signal transmission paths is greater than the preset number, that is, the signal transmission distance between the device 1 and the device 2 is large, for example, it is greater than a second preset distance (such as 1 meter), it is easy to identify multiple paths, and the multipath effect needs to be considered, as shown in FIG. 5, whereby a precise position determination is initiated, and the angle and the distance of the second wireless communication device 102 relative to the first wireless communication device 101 are determined according to the phase difference of the channel state information of the same subcarriers received by the two or more antennas and the plurality of signal transmission paths.

Figure 13:
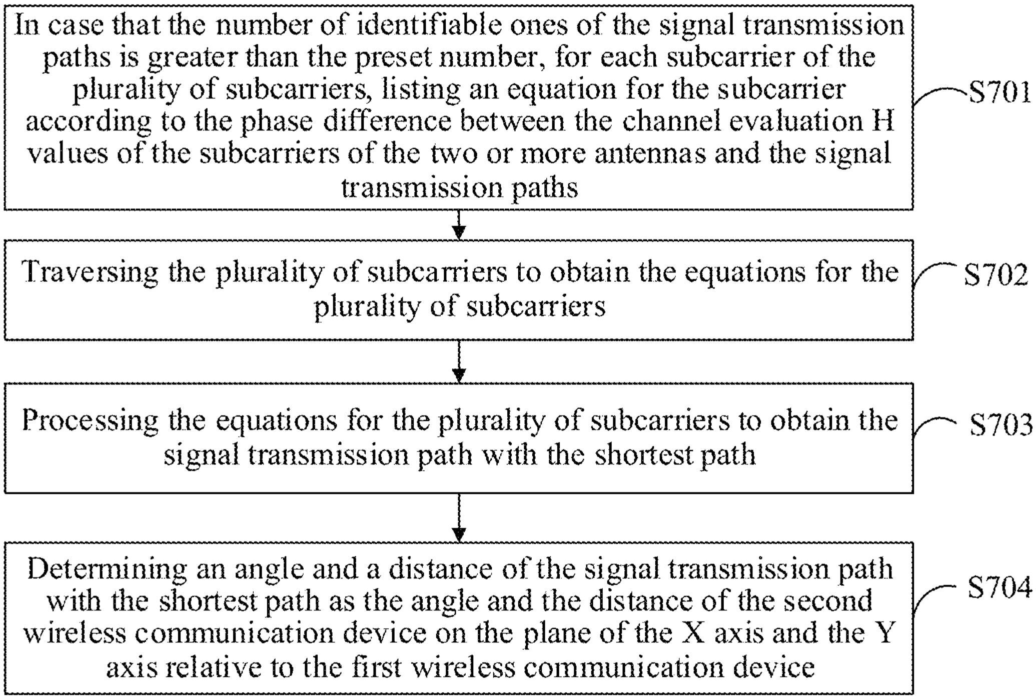
FIG. 13 is a flow chart of a method for determining a relative position according to an embodiment of the present disclosure.

In some embodiments of the present disclosure, as shown in FIG. 13, the implementation of step 304 includes the following step 701 to step 704.

In step 701, in case that the number of identifiable ones of the signal transmission paths is greater than the preset number, for each subcarrier in the plurality of subcarriers, an equation for the subcarrier is listed according to the phase difference between the H values of the subcarriers of the two or more antennas and the signal transmission paths.

Figure 14:
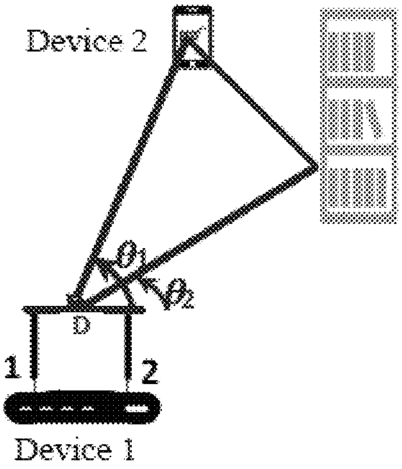
FIG. 14 is an example diagram of a method for determining a relative position according to an embodiment of the present disclosure.

In a scenario of the present disclosure, as shown in FIG. 14, the device 1 is the first wireless communication device 101, the device 2 is the second wireless communication device 102, and there are two signal transmission paths between the device 1 and the device 2, including the direct path and the reflection path, the angle of arrival of the direct path is $\theta_1$, and the angle of arrival of the reflection path is $\theta_2$.

Figure 15:
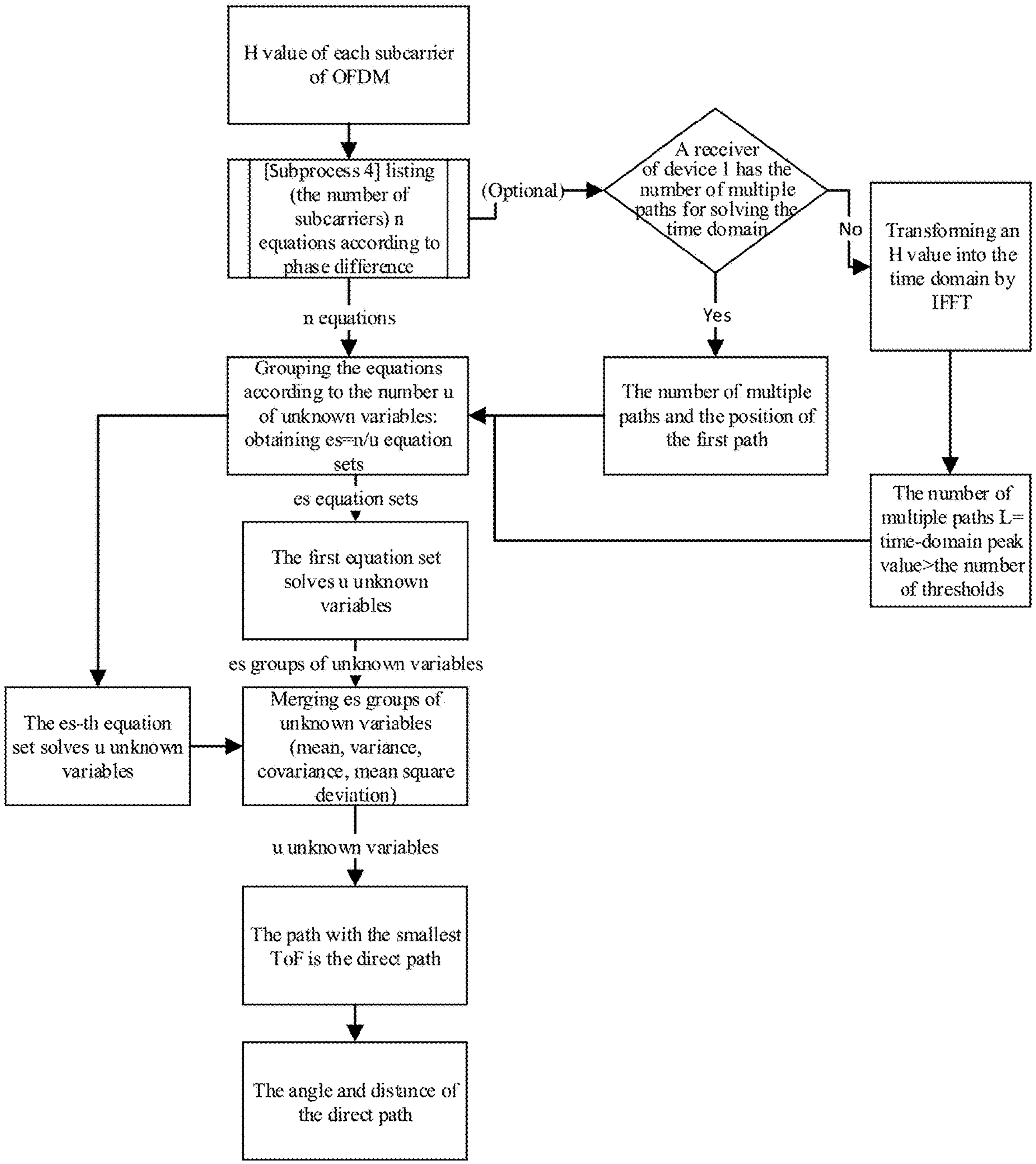
FIG. 15 is an example flow chart of a method for determining a relative position according to an embodiment of the present disclosure.

In some embodiments of the present disclosure, as shown in FIG. 15, the method further includes: determining whether a receiver of the first wireless communication device 101 has the number of a plurality of paths for solving a time-frequency; if so, the number of the plurality of paths and a position of a first path are obtained, in which the number of the plurality of paths refers to the number of the signal transmission paths, and the position of the first path refers to a position of the shortest transmission path; if not, a time domain value is obtained by inverse fast fourier transformation IFFT of the H values of the subcarriers of the two or more antennas, a plurality of time-domain peaks are determined, and the number of ones of the plurality of time-domain peaks greater than the preset threshold is determined as the number of the plurality of paths.

In step 702, the plurality of subcarriers are traversed to obtain the equations of the plurality of subcarriers.

In some embodiments of the present disclosure, the first wireless communication device 101 includes the antenna 1 and the antenna 2, four subcarriers are used for interaction, the four subcarriers include the subcarrier 1, the subcarrier 2, the subcarrier 3, subcarrier 4, and there are two signal transmission paths, including path 1 and path 2. This serves as an example.

An equation for the subcarrier 1 is as follows:

$$\text{the antenna 1 } HAnt1SubC1 = \Gamma_1 + \Gamma_2;$$

$$\text{the antenna 2 } HAnt2SubC1 = \Gamma_1\Phi_1 + \Gamma_2\Phi_2 = \Gamma_1 e^{-\frac{j2\pi d\sin\theta_1}{c}fc} + \Gamma_2 e^{-\frac{j2\pi d\sin\theta_2}{c}fc}.$$

HAnt2SubC1 represents the H value of the subcarrier 1 received by the antenna 1, $\Gamma_1$, $\Gamma_2$ represent reset attenuation of the path 1 and the path 2, respectively, HAnt2SubC1 represents the H value of the subcarrier 1 received by the antenna 2, $\Phi_1$ represents the phase difference between the same subcarriers received by the antenna 1 and the antenna 2 due to a change in an incident angle when the transmission path is the path 1, $\theta_1$ is the angle of arrival (AOA) of the signal of the path 1, and a value of $\Phi_1$ depends on $\theta_1$, i.e.

$$\Phi_1 = e^{-\frac{j2\pi d\sin\theta_1}{c}fc},$$

in which fc1 is the frequency of the subcarrier 1; in the same way, $\Phi_2$ represents the phase difference between the same subcarriers received by the antenna 1 and the antenna 2 due to the change in the incident angle when the transmission path is the path 2, $\theta_2$ is the angle of arrival (AOA) of the signal of the path 2, and a value of $\Phi_2$ depends on $\theta_2$, i.e.

$$\Phi_2 = e^{-\frac{j2\pi d\sin\theta_2}{c}fc},$$

in which fc2 is the frequency of the subcarrier 2. It should be noted that a difference between fc1 and fc2 is very small, so that they are uniformly considered as fc in the above equation for the subcarrier 1.

Thus, the phase difference between the H values of the subcarriers 1 received by the antenna 1 and the antenna 2 is HAnt2SubC1–HAnt2SubC1, which is substituted into the above equation for the subcarrier 1 to obtain a following formula:

$$PDSubcarrier1 = \Gamma_1\left(e^{-\frac{j2\pi d\sin\theta_1}{c}fc} - 1\right) + \Gamma_2\left(e^{-\frac{j2\pi d\sin\theta_2}{c}fc} - 1\right).$$

PDSubcarrier1 represents the phase difference of the subcarriers 1, i.e., the phase difference between the H values of the subcarriers 1 received by the antenna 1 and the antenna 2.

An equation for the subcarrier 2 is as follows:

$$\text{the antenna 1 } HAnt1SubC2 = \Gamma_1\Omega_{1c2} + \Gamma_2;$$

$$\text{the antenna 2 } HAnt2SubC2 = \Gamma_1\Phi_1\Omega_{1c2} + \Gamma_2\Phi_2\Omega_{2c2} = \Gamma_1 e^{-\frac{j2\pi d\sin\theta_1}{c}fc} e^{-j2\pi(f_{c2}-f_{c1})\tau_1} + \Gamma_2 e^{-\frac{j2\pi d\sin\theta_2}{c}fc} e^{-j2\pi(f_{c2}-f_{c1})\tau_2}.$$

HAnt1SubC2 represents the H value of the subcarrier 2 received by the antenna 1, HAnt2SubC2 represents the H value of the subcarrier 2 received by the antenna 2, $\Omega_{1c2}$ represents the phase difference between the subcarriers 2 received by the antenna 1 and the antenna 2 due to a transmission time and a carrier frequency difference when the transmission path is the path 1, and the value of $\Omega_{1c2}$ depends on a time of flight (TOF) of the path 1 and a frequency difference value of the subcarriers 2 received by the antenna 1 and the antenna 2, i.e., $\Omega_{1c2}=e^{-j2\pi(f_{c2}-f_{c1})\tau_1}$, and $\tau_1$ represents the time of flight of the path 1, that is, the time taken by a signal to reach the first wireless communication device 101 through the path 1; in the same way, $\Omega_{2c2}$ represents the phase difference between the subcarriers 2 received by the antenna 1 and the antenna 2 due to the transmission time and the carrier frequency difference when the transmission path is the path 2, in which a value of $\Omega_{2c2}$ depends on a time of flight of the path 2 and a frequency difference value between the subcarriers 2 received by the antenna 1 and the antenna 2, i.e., $\Omega_{2c2}=e^{-j2\pi(f_{c2}-f_{c1})\tau_2}$, and $\tau_2$ represents the time of flight of the path 2, that is, the time taken by a signal to reach the first wireless communication device 101 through the path 2.

Thus, the phase difference between the H values of the subcarriers 2 received by the antenna 1 and the antenna 2 is HAnt1SubC2–HAnt2SubC2, which is substituted in to the above equation for the subcarrier 2 to obtain the following formula:

$$PDSubCarrier2 = \Gamma_1\left(e^{-\frac{j2\pi d\sin\theta_1}{c}fc} - 1\right)e^{-j2\pi(f_{c2}-f_{c1})\tau_1} + \Gamma_2\left(e^{-\frac{j2\pi d\sin\theta_2}{c}fc} - 1\right)e^{-j2\pi(f_{c2}-f_{c1})\tau_2}.$$

PDSubcarrier2 represents the phase difference of the subcarriers 2, i.e., the phase difference between the H values of the subcarriers 2 received by the antenna 1 and the antenna 2.

An equation for the subcarrier 3 is as follows:

$$\text{the antenna 1 } HAnt1SubC3 = \Gamma_1\Omega_{1c3} + \Gamma_2;$$

$$\text{the antenna 2 } HAnt2SubC3 = \Gamma_1\Phi_1\Omega_{1c3} + \Gamma_2\Phi_2\Omega_{2c3} = \Gamma_1\Phi_1\Omega_{1c2}\hat{\ }2 + \Gamma_2\Phi_2\Omega_{2c2}\hat{\ }2 = \Gamma_1 e^{-\frac{j2\pi d\sin\theta_1}{c}fc} e^{-j2\pi(f_{c3}-f_{c1})\tau_1} + \Gamma_2 e^{-\frac{j2\pi d\sin\theta_2}{c}fc} e^{-j2\pi(f_{c3}-f_{c1})\tau_2}.$$

HAnt1SubC3 represents the H value of the subcarrier 3 received by the antenna 1, HAnt2SubC3 represents the H value of the subcarrier 3 received by the antenna 2, $\Omega_{1c3}$ represents the phase difference between the subcarriers 3 received by the antenna 1 and the antenna 2 due to the transmission time and the carrier frequency difference when the transmission path is the path 1, $\Omega_{2c3}$ represents the phase difference between the subcarriers 3 received by the antenna 1 and the antenna 2 due to the transmission time and the carrier frequency difference when the transmission path is the path 2, $\Omega_{1c3}$ and $\Omega_{2c3}$ are determined with reference to $\Omega_{1c2}$ and $\Omega_{2c2}$, i.e., $\Omega_{1c3}=e^{-j2\pi(f_{c3}-f_{c1})\tau_1}$, and $\Omega_{2c3}=e^{-j2\pi(f_{c3}-f_{c1})\tau_2}$, in which $f_{c3}$ represents the frequency of the subcarrier 3.

Thus, the phase difference between the H values of the subcarriers 3 received by the antenna 1 and the antenna 2 is HAnt1SubC3–HAnt2SubC3, which is substituted into the above equation for the subcarrier 3 to obtain a following formula:

$$PDSubCarrier3 = \Gamma_1\left(e^{-\frac{j2\pi d\sin\theta_1}{c}fc}-1\right)e^{-j2\pi(f_{c3}-f_{c1})\tau_1}+\Gamma_2\left(e^{-\frac{j2\pi d\sin\theta_2}{c}fc}-1\right)e^{-j2\pi(f_{c3}-f_{c1})\tau_2}.$$

PDSubcarrier3 represents the phase difference of the subcarrier 3, i.e., the phase difference between the H values of the subcarriers 3 received by the antenna 1 and the antenna 2.

An equation for the subcarrier 4 is as follows:

$$\text{the antenna 1 } HAnt1SubC4 = \Gamma_1\Omega_{1c4}+\Gamma_2;$$

$$\text{the antenna 2 } HAnt2SubC4 = \Gamma_1\Phi_1\Omega_{1c4}+\Gamma_2\Phi_2\Omega_{2c4}; =$$

$$\Gamma_1\Phi_1\Omega_{1c2}\hat{}3+\Gamma_2\Phi_2\Omega_{2c2}\hat{}3 =$$

$$\Gamma_1 e^{-\frac{j2\pi d\sin\theta_1}{c}fc}e^{-j2\pi(f_{c4}-f_{c1})\tau_1}+\Gamma_2 e^{-\frac{j2\pi d\sin\theta_2}{c}fc}e^{-j2\pi(f_{c4}-f_{c1})\tau_2}.$$

HAnt1SubC4 represents the H value of the subcarrier 4 received by the antenna 1, HAnt2SubC4 represents the H value of the subcarrier 4 received by the antenna 2, $\Omega_{1c4}$ represents the phase difference between the subcarriers 4 received the antenna 1 and the antenna 2 due to the transmission time and the carrier frequency difference when the transmission path is the path 1, $\Omega_{2c4}$ represents the phase difference between the subcarriers 4 received by the antenna 1 and the antenna 2 generated by the transmission time and the carrier frequency difference when the transmission path is the path 2, $\Omega_{1c4}$ and $\Omega_{2c4}$ are determined with reference to $\Omega_{1c2}$ and $\Omega_{2c2}$, i.e., $\Omega_{1c4}=e^{-j2\pi(f_{c4}-f_{c1})\tau_1}$, and $\Omega_{2c4}=e^{-j2\pi(f_{c4}-f_{c1})\tau_2}$, in which $f_{c4}$ represents the frequency of the subcarrier 4.

Thus, the phase difference between the H values of the subcarriers 4 received by the antenna 1 and the antenna 2 is HAnt1SubC4–HAnt2SubC4, which is substituted into the above equation for the subcarrier 4 to obtain a following formula:

$$PDSubCarrier4 = \Gamma_1\left(e^{-\frac{j2\pi d\sin\theta_1}{c}fc}-1\right)e^{-j2\pi(f_{c4}-f_{c1})\tau_1}+\Gamma_2\left(e^{-\frac{j2\pi d\sin\theta_2}{c}fc}-1\right)e^{-j2\pi(f_{c4}-f_{c1})\tau_2}.$$

PDSubcarrier4 represents the phase difference of the subcarrier 4, i.e., the phase difference between the H values of the subcarriers 4 received by the antenna 1 and the antenna 2.

In step 703, the equations for the plurality of subcarriers are processed to obtain the signal transmission path with the smallest time of flight (ToF).

In some embodiments of the present disclosure, the processing of the equations for the plurality of subcarriers includes: obtaining the number of the signal transmission paths; obtaining the number of unknown variables according to the number of the signal transmission paths, the number of antennas of the first wireless communication device and the number of the plurality of subcarriers; according to the number of unknown variables, grouping the equations for the plurality of subcarriers to obtain a plurality of equation sets; and performing merge processing on the unknown variables of the plurality of equation sets, the merge processing including one or more of mean, variance, covariance, and mean square deviation processing.

In some embodiments, as shown in FIG. 14, after n equations of the subcarriers are listed, n being a positive integer, the equations are grouped according to the number of unknown variables u to obtain n/u equation sets, the n/u equation sets are solved sequentially to obtain u unknown variables, the unknown variables of the n/u equation sets are merged, and the merging manner includes mean, variance, covariance, mean square deviation processing, etc., in which the unknown variable includes the time of flight (ToF) and the angle of arrival (AoA) of each of the plurality of signal transmission paths, and the signal transmission path with the smallest time of flight can be obtained after solving.

In some embodiments, taking an example where the number L of the transmission paths is 2, the number m of the antennas is 2, and the number n of the subcarriers is 32, assuming that the first wireless communication device 101 and the second wireless communication equipment 102 are synchronized, a sampling frequency offset (SFO) and a sampling time offset (STO) are known, the number u of unknown variables is equal to L*(m−1) AoAs plus L ToFs, i.e. being equal to 4, including 2 AoAs of unknown variables, and 2 ToFs of unknown variables, then n/u=8 equation sets can be listed, and the 8 equation sets are solved separately and then merged. In this example, the number n of subcarriers is 32, which is greater than the number u of unknown variables. A Jacobian matrix can also be extended, and solved by the Newton-Raphson iterative method and the least squares method, to obtain the transmission path with the smallest time of flight.

It should be noted that the Newton iterative method is a commonly used method for solving a nonlinear equation set, which linearizes the nonlinear equation set in the vicinity of an estimated solution, then solves the linearized equation set, and then updates an estimated value of the solution. This process is repeated until the accuracy of the solution meets the requirements.

In step 704, an angle and a path length of the signal transmission path with the smallest time of flight are determined as the angle and the distance of the second wireless communication device 102 on the plane of the X axis and the Y axis relative to the first wireless communication device 101.

In some embodiments, the path length of the signal transmission path can be determined according to the time of flight of the signal transmission path with the smallest time of flight, the path length is determined as the distance of the second wireless communication device 102 on the plane of the X axis and Y the axis relative to the first wireless communication device 101, and the angle of arrival of the signal transmission path with the smallest time of flight is determined as the angle of the second wireless communication device 102 on the plane of the X axis and the Y axis relative to the first wireless communication device 101.

In some embodiments of the present disclosure, the method further includes: obtaining the angle of the first wireless communication device 101 on the plane of the X axis and the Z axis; according to the angle of the first wireless communication device 101 on plane of the X axis and the Z axis and the angle and/or the distance of the second wireless communication device 102 in the plane of the X axis and the Y axis relative to the first wireless communication device 101, determining an orientation of the second wireless communication device 102 in a three-dimensional space of the X axis, the Y axis and the Z axis relative to the first wireless communication device 101.

Figure 16:
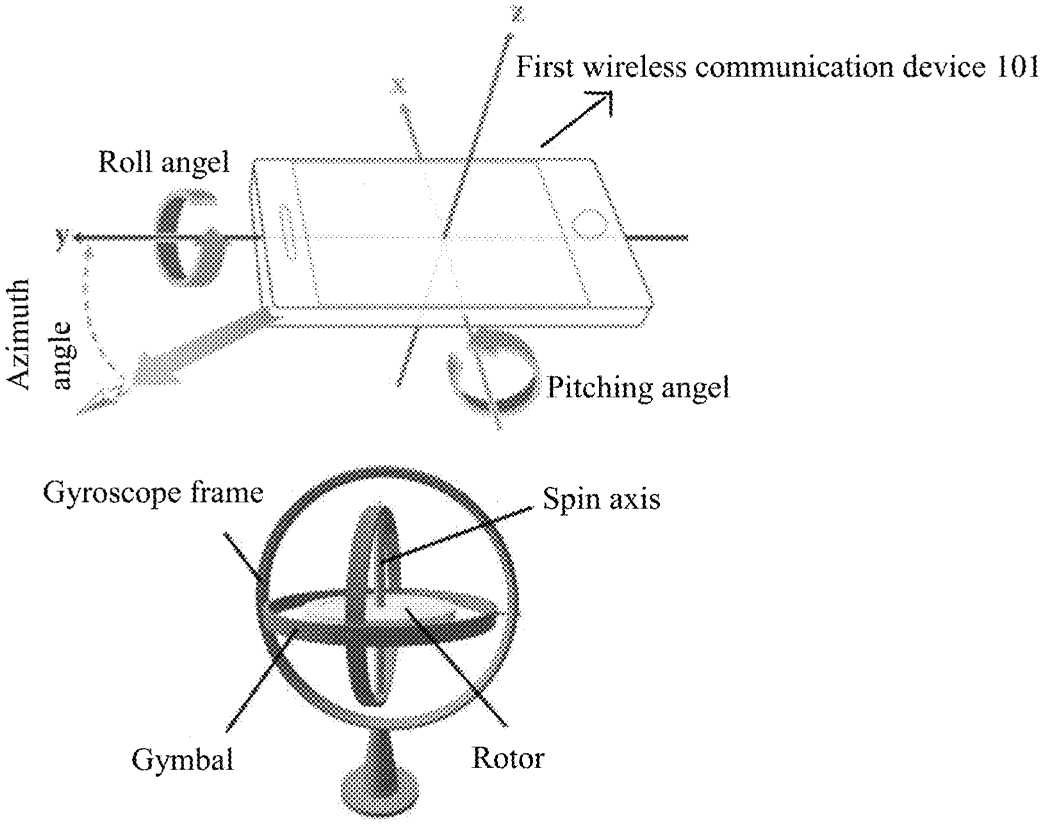
FIG. 16 is an example diagram of an angle on a plane of an X axis and a Z axis provided by a sensor according to an embodiment of the present disclosure.

In some embodiments, the angle of the first wireless communication device 101 on the plane of the X axis and the Z axis can be obtained through the sensor built in the first wireless communication device 101. Specifically, through auxiliary information fed back by a direction sensor/a level/a three-axis gyroscope of the first wireless communication device 101, the angle of the first wireless communication device 101 on the plane of the X axis and the Z axis can be determined, and FIG. 16 shows that the angle of the first wireless communication device 101 on the plane of the X axis and the Z axis is determined through the three-axis gyroscope.

In some embodiments of the present disclosure, the method further includes: displaying relative position information on a screen, in which the relative position information includes one or more of: the angle of the second wireless communication device 102 on the plane of the X axis and the Y axis relative to the first wireless communication device 101, the distance of the second wireless communication device 102 on the plane of the X axis and the Y axis relative to the first wireless communication device 101, and the orientation of the second wireless communication device 102 in the three-dimensional space of the X axis, the Y axis and the Z axis relative to the first wireless communication device 101.

In some embodiments of the present disclosure, as shown in FIG. 5, if the device 1 needs to display the position, the device 1 displays the relative orientation of the device 2 on the screen, that is, the orientation of the device 2 in the three-dimensional space of the X axis, the Y axis and the Z axis relative to the device 1.

In some embodiments of the present disclosure, the method further includes: sending the relative position information to the second wireless communication device, in which the relative position information includes one or more of: the angle of the second wireless communication device 102 on the plane of the X axis and the Y axis relative to the first wireless communication device 101, the distance of the second wireless communication device 102 on the plane of the X axis and the Y axis relative to the first wireless communication device 101, and the orientation of the second wireless communication device 102 in the three-dimensional space of the X axis, the Y axis and the Z axis relative to the first wireless communication device 101.

In some embodiments of the present disclosure, as shown in FIG. 5, if the device 2 needs to display the position, the device 1 sends the relative position information to the device 2, the device 2 displays the relative orientation of the device 2 on the screen, that is, the orientation of the device 2 in the three-dimensional space of the X axis, the Y axis and the Z axis relative to the device 1.

In summary, the method for determining the relative position according to the present disclosure is performed by the first wireless communication device 101, the method includes: determining the number of identifiable ones of the signal transmission paths with the second wireless communication device, obtaining the channel state information (CSI) of the plurality of subcarriers received by the two or more antennas; and in case that the number of identifiable ones of the signal transmission paths is less than the preset number, and determining the angle of the second wireless communication device relative to the first wireless communication device according to the phase difference of the channel state information of the same subcarriers received by the two or more antennas. In the method of the present disclosure, only by upgrading the application software, the position determination between two or more devices can be automatically completed through the existing wireless communication interface and antenna design in the traditional wireless communication device, without modifying the hardware design and modifying the hardware and firmware, thus improving the user experience. After the relative position between the wireless communication devices is determined in the method of the present disclosure, it can be automatically displayed on the screen without manual setting, thus greatly improving the user experience.

Figure 17:
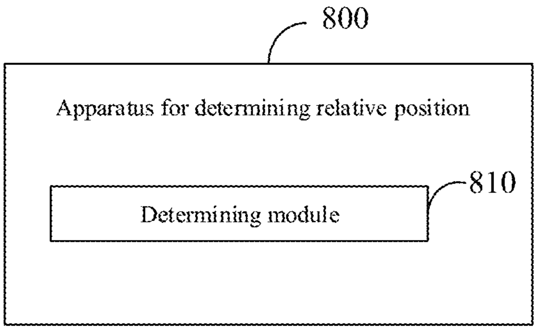
FIG. 17 is a schematic diagram of an apparatus for determining a relative position according to an embodiment of the present disclosure.

FIG. 17 is a schematic diagram of an apparatus 800 for determining a relative position according to an embodiment of the present disclosure. As shown in FIG. 5, the apparatus 800 for determining the relative position includes: a determining module 810 configured to determine a relative position of a second wireless communication device according to a phase difference between the same subcarriers received by two or more antennas, in which the subcarrier is configured to carry a signal sent by the second wireless communication device, and a plurality of subcarriers are provided.

In some embodiments, the determining module 810 is further configured to determine the number of identifiable ones of signal transmission paths with the second wireless communication device.

In some embodiments, the determining module 810 is specifically configured to: obtain channel state information (CSI) of the plurality of subcarriers received by the two or more antennas; and in case that the number of identifiable ones of the signal transmission paths is less than a preset number, determine an angle of the second wireless communication device relative to the first wireless communication device according to the phase difference of the channel state information of the same subcarriers received by the two or more antennas.

In some embodiments, the determining module 810 is specifically configured to: in case that the number of identifiable ones of the signal transmission paths is greater than the preset number, determine the angle and a distance of the second wireless communication device relative to the first wireless communication device according to the phase difference of the channel state information of the same subcarriers received by the two or more antennas and the signal transmission paths.

In some embodiments, the device 800 further includes a transceiving module, and in case that the first wireless communication device and/or the second wireless communication device do not support sounding frame interaction, the transceiving module is configured to: for each antenna of the first wireless communication device, receive a multi-carrier modulated signal sent by the second wireless communication device through the antenna; and perform a channel evaluation according to the multi-carrier modulated signal to obtain channel evaluation H values of the plurality of subcarriers received by the antenna.

In some embodiments, in case that the first wireless communication device and the second wireless communication device support the sounding frame interaction, the transceiving module is further configured to: for each antenna of the first wireless communication device, send a NDP frame to the second wireless communication device through the antenna; and receive a sounding response frame sent by the second wireless communication device, in which the sounding response frame is sent by the second wireless communication device after receiving the NDP frame and performing the channel evaluation according to the NDP frame, and the sounding response frame includes the channel evaluation H values of the plurality of subcarriers after being compressed; and decompress the sounding response frame to obtain the channel evaluation H values of the plurality of subcarriers received by the antenna.

In some embodiments, the device 800 further includes a correction module configured to: determine whether an angle of the first wireless communication device on a plane of the X axis and the Z axis is zero; and in case that the angle of the first wireless communication device on the plane of the X axis and the Z axis is not zero, correct the channel evaluation H value of each subcarrier according to the angle of the first wireless communication device on the plane of the X axis and the Z axis.

In some embodiments, the determining module 810 is specifically configured to: determine the phase difference between the channel evaluation H values of the subcarriers of the two or more antennas, for each subcarrier of the plurality of subcarriers, in case that the number of identifiable ones of the signal transmission paths is less than the preset number; determine an angle value of the subcarrier according to the phase difference; traverse the plurality of subcarriers to obtain the angle values of the plurality of subcarriers; and match the angle values of the plurality of subcarriers with an interval threshold of the phase difference to obtain the angle of the second wireless communication device on the plane of the X axis and the Y axis relative to the first wireless communication device, in response to that the interval threshold of the phase difference of the plurality of subcarriers is obtained from a historical library.

In some embodiments of the present disclosure, the determining device 810 is further configured to: obtain an average value of the angle values of the plurality of subcarriers, in response to that the interval threshold of the phase difference of the plurality of subcarriers is not obtained from the historical library; and determine the average value as the angle of the second wireless communication device on the plane of the X axis and the Y axis relative to the first wireless communication device.

In some embodiments, the determining module 810 is specifically configured to: list an equation for the subcarrier according to the phase difference between the channel evaluation H values of the subcarriers of the two or more antennas and the signal transmission path, for each subcarrier of the plurality of subcarriers, in case that the number of identifiable ones of the signal transmission paths is greater than the preset number; traverse the plurality of subcarriers to obtain the equations of the plurality of subcarriers; process the equations of the plurality of subcarriers to obtain the signal transmission path with the smallest time of flight (ToF); and determine an angle and a path length of the signal transmission path with the smallest time of flight as the angle and the distance of the second wireless communication device on the plane of the X axis and the Y axis relative to the first wireless communication device.

In some embodiments, processing the equations for the plurality of subcarriers includes: obtaining the number of the signal transmission paths; obtaining the number of unknown variables according to the number of the transmission paths, the number of antennas of the first wireless communication device and the number of the plurality of subcarriers; according to the number of unknown variables, grouping the equations for the plurality of subcarriers to obtain a plurality of equation sets; and performing merge processing on the unknown variables of the plurality of equation sets, the merge processing including one or more of mean, variance, covariance, and mean square deviation processing.

In some embodiments, the determining module 810 is further configured to: obtain the angle of the first wireless communication device on the plane of the X axis and the Z axis; and determine an orientation of the second wireless communication device in a three-dimensional space of the X axis, the Y axis and the Z axis relative to the first wireless communication device according to the angle of the first wireless communication device on the plane of the X axis and the Z axis and the angle and/or the distance of the second wireless communication device in the plane of the X axis and the Y axis relative to the first wireless communication device.

In some embodiments, the device further includes a display module configured to display relative position information on a screen, in which the relative position information includes one or more of: the angle of the second wireless communication device on the plane of the X axis and the Y axis relative to the first wireless communication device, the distance of the second wireless communication device on the plane of the X axis and the Y axis relative to the first wireless communication device, and the orientation of the second wireless communication device in the three-dimensional space of the X axis, the Y axis and the Z axis relative to the first wireless communication device.

In some embodiments, the transceiving module is further configured to: send the relative position information to the second wireless communication device, in which the relative position information includes one or more of: the angle of the second wireless communication device on the plane of the X axis and the Y axis relative to the first wireless communication device, the distance of the second wireless communication on the plane of the X axis and the Y axis device relative to the first wireless communication device, and the orientation of the second wireless communication device in the three-dimensional space of the X axis, the Y axis and the Z axis relative to the first wireless communication device.

Since the apparatus provided in the embodiments of the present disclosure corresponds to the method provided in the above several embodiments, the implementations of the method is also applicable to the apparatus provided in the embodiments, which will not be described in the embodiments.

In summary, the apparatus for determining the relative position proposed in the present disclosure is arranged on the first wireless communication device 101, through the determining module, the relative position determination is realized according to the phase differences between the plurality of same carriers of the plurality of antennas, and the position determination between the wireless communication devices can be completed without modification of the hardware design, with a low cost, wide application scenarios, and no need for users to manually set, thus improving the user experience.

In the embodiments of the present disclosure, the method and the apparatus provided in the embodiments of the present disclosure are introduced. To achieve various functions in the methods provided in the embodiments of the application, an electronic device may include a hardware structure and a hardware module, to achieve the above functions in the form of the hardware structure, the hardware module or a combination of the hardware structure and the hardware module. A certain function of the above functions may be performed by the hardware structure, the software module or the combination of the hardware structure and the software module.

Figure 18:
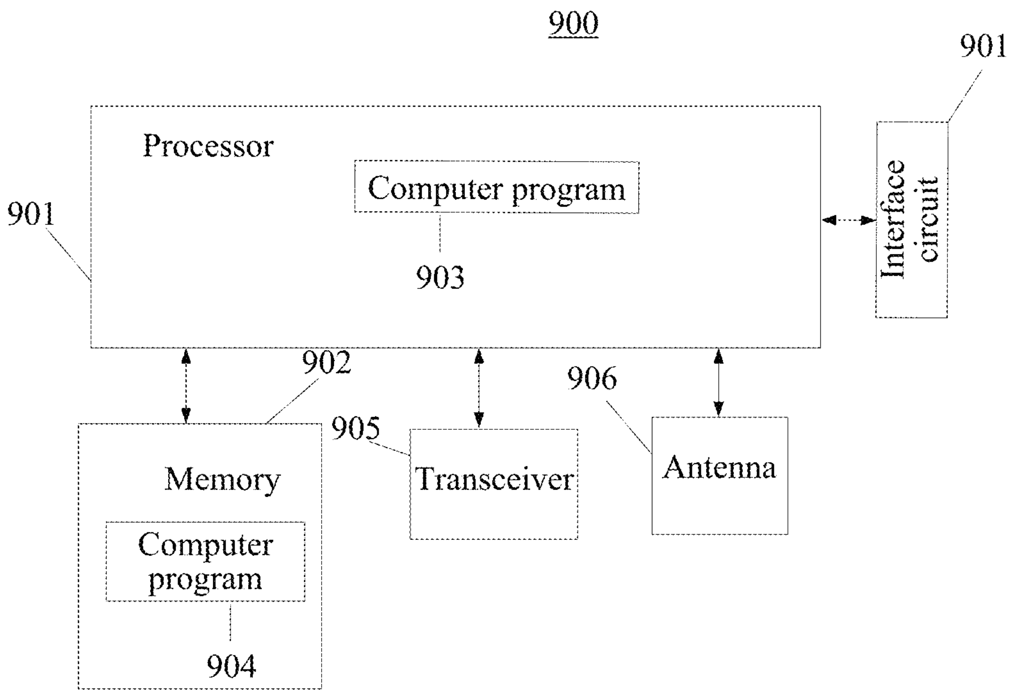
FIG. 18 is a schematic diagram of a communication device according to an embodiment of the present disclosure.

Referring to FIG. 18, FIG. 18 is a schematic diagram of a communication device 900 according to an embodiment of the present disclosure. The communication device 900 may be a network device, a user equipment (UE), a chip, a system on chip or a processor that supports the network device to implement the method, or a chip, a system on chip or a processor that supports user equipment to implement the method. The device may be configured to implement the method described in the method embodiments, which may refer to descriptions in the method embodiments.

The communication device 900 may include one or more processors 901. The processor 901 may include a general purpose processor or a dedicated processor. For example, the processor may be a baseband processor or a central processor. The baseband processor may be configured to process a communication protocol and communication data, and the central processor may be configured to control a communication device (e.g., a base station, a baseband chip, a terminal, a terminal chip, a DU or CU, etc.), to execute a computer program, and process data of the computer program.

Optionally, the communication device 900 may further include one or more memories 902 with a computer program 904 stored thereon. The processor 901 executes the computer program 904 so that the communication device 900 performs the method as described in the above method embodiments. Optionally, the memory 902 may further store data. The communication device 900 and the memory 902 may be arranged alone or integrated together.

Optionally, the communication device 900 may further include a transceiver 905 and an antenna 906. The transceiver 905 may be referred to as a transceiving unit, a transceiver or a transceiving circuit, which may be configured to achieve a transceiving function. The transceiver 905 may include a receiver and a transmitter. The receiver may be referred to as a receiving machine or a receiving circuit, etc., for implementing a receiving function. The transmitter may be referred to as a transmitting machine or a transmitting circuit, etc. for implementing a transmitting function.

Optionally, the communication device 900 may further include one or more interface circuits 907. The interface circuit 907 is configured to receive code instructions and transmit the code instructions to the processor 901. The processor 901 runs the code instructions so that the communication device 900 performs the method described in the above method embodiments.

In an implementation, the processor 901 may include a transceiver configured to implement receiving and transmitting functions. For example, the transceiver may be a transceiving circuit, or an interface, or an interface circuit. The transceiving circuit, the interface or the interface circuit configured to implement the receiving and transmitting functions may be separate or integrated together. The transceiving circuit, the interface or the interface circuit may be configured to read and write codes/data. Or, the transceiving circuit, the interface or the interface circuit may be configured to transmit or deliver a signal.

In an implementation, the processor 901 may store a computer program 903. The computer program 903 runs on the processor 901, so that the communication device 900 performs the method as described in the above method embodiments. The computer program 903 may be solidified in the processor 901, in which case the processor 901 may be implemented by hardware.

In an implementation, the communication device 900 may include a circuit that may implement a transmitting or receiving or communication function in the above method embodiments. The processor and the transceiver described in the present disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver may further be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe) and gallium arsenide (GaAs).

The communication device described in the above embodiments may be the network device or the user equipment, but the scope of the communication device described in the present disclosure is not limited thereto, and a structure of the communication device may not be limited to FIG. 9. The communication device may be a stand-alone device or may be a part of a large device. For example, the communication device may be:

(1) a stand-alone integrated circuit (IC), or a chip, or a system on chip or a subsystem;
(2) a set of one or more ICs, optionally, which may also include a storage component for storing data and a computer program;
(3) an ASIC, such as a Modem;
(4) a module that may be embedded within other devices;
(5) a receiver, a terminal, a smart terminal, a cellular phone, a wireless device, a handset, a mobile unit, an on-board device, a network device, a cloud device, an artificial intelligence device, etc.; and
(6) others, and so forth.

Figure 19:
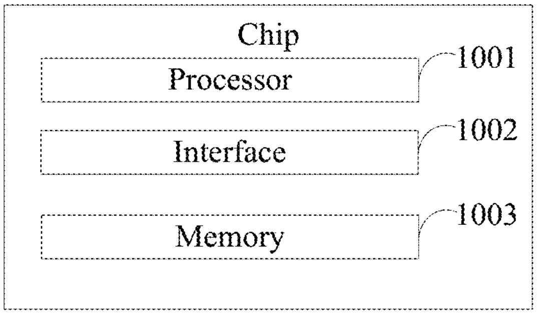
FIG. 19 is a schematic diagram of a chip according to an embodiment of the present disclosure.

In case that the communication device may be a chip or a system on chip, please refer to a schematic diagram of a chip as illustrated in FIG. 19. The chip illustrated in FIG. 19 may include a processor 1001 and an interface 1002. There may be one or more processors 1001, and there may be a plurality of interfaces 1002.

Optionally, the chip further includes a memory 1003. The memory 1003 is configured to save a necessary computer program and data.

Those skilled in the related art may understand that, various illustrative logical blocks and steps listed in the embodiments of the present disclosure may be implemented by an electronic hardware, a computer software or a combination thereof. Whether the function is implemented by the hardware or the software depends on specific applications and design requirements for the whole system. Those skilled in the art may implement the functions by using various methods for each specific application, but such an implementation should not be understood as beyond the protection scope of the embodiments of the present disclosure.

A non-transitory computer-readable storage medium stored with computer instructions is proposed according to embodiments of the present disclosure. The computer instructions are configured to cause a computer to perform the method for determining the relative position described in the above embodiments of the present disclosure.

A computer program product including a computer program is provided according to embodiments of the present disclosure. The computer program is configured to perform the method for determining the relative position described in the above embodiments of the present disclosure when performed by a processor.

In the above embodiments, the functions may be wholly or partially implemented by the software, the hardware, the firmware, or any combination thereof. When implemented by the software, the functions may be implemented wholly or partially in the form of a computer program product. The computer program product includes one or more computer programs. Procedures or functions according to embodiments of the present application are wholly or partially generated when the computer program is loaded and executed on the computer. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server, or data center to another website, computer, server, or data center in a wire manner (such as a coaxial cable, a fiber optic, a digital subscriber line (DSL)) or in a wireless manner (such as infrared, wireless, microwave). The computer-readable storage medium may be any available medium that may be stored by the computer or a data storage device such as a server and a data center that integrate one or more available media. The applicable medium may be a magnetic medium (such as a floppy disk, a hard disk and a magnetic tape), an optical medium (such as a digital video disk (DVD)), or a semiconductor medium (such as a solid state disk (SSD)).

Those skilled in the art may understand that various numbers such as first and second involved in present disclosure are distinguished merely for convenience of description, and are not intended to limit the scope of embodiments of the present disclosure, and also not to indicate an order of precedence.

The expression “at least one” in the present disclosure may also be described as one or more, and the expression “a plurality of” may be two, three, four or more, which is not limited in the present disclosure. In embodiments of the present disclosure, for a kind of technical feature, the technical features are distinguished by “first”, “second”, “third”, “A”, “B”, “C” and “D”, and there is no order of precedence or magnitude between the technical features distinguished by “first”, “second”, “third”, “A”, “B”, “C” and “D”.

As used herein, terms “machine readable medium” and “computer readable medium” refer to any computer program product, device, and/or apparatus (e.g., a disk, an optical disc, a memory, a programmable logic device (PLD)) used to provide machine instructions and/or data to a programmable processor, including a machine-readable medium for receiving machine instructions as machine-readable signals. The term “machine readable signal” refers to any signal used to provide machine instructions and/or data to a programmable processor.

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with the implementations of the systems and technologies described herein via the graphical user interface or the web browser), or in a computing system including any combination of the background component, the middleware component, or the front-end component. Components of the system may be interconnected by digital data communication (for example, a communication network) of any form or medium. Examples of the communication network includes: a local area network (LAN), a wide area network (WAN), and an Internet.

The computer system may include a client and a server. The client and the server are generally far away from each other and generally interact with each other through the communication network. The relationship between the client and the server is generated by computer programs that are run on the corresponding computer and have a client-server relationship with each other.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited herein.

In addition, it should be noted that, embodiments of the present disclosure may be implemented alone or implemented in combination with other embodiments when the solution is allowed.

Those skilled in the related art may realize that, units and algorithm steps of the examples described in combination with embodiments of the present disclosure, may be implemented by an electronic hardware or a combination of an electronic hardware and a computer software. Whether the functions are executed by the hardware or the software depends on a specific application and a design constraint of the technical solution. Those skilled in the art may adopt different methods for each specific application to implement the described functions, but such implementation should not be considered beyond the scope of the present disclosure.

Those skilled in the art may clearly understand that, a specific working process of the system, the apparatus and the unit described above may refer to a corresponding process in the above method embodiments, which will not be repeated here.

The above are only implementations of the present disclosure. However, the protection scope of the present disclosure is not limited here. Changes and substitutions that are easily considered by those skilled in the art shall be contained within the protection scope of the present disclosure. Therefore, the protection scope of the present disclosure shall subject to the protection scope of claims.

What is claimed is:

1. A method for determining a relative position, the method being performed by a first wireless communication device, wherein the first wireless communication device comprises two or more antennas, and the method comprises:

determining a relative position of a second wireless communication device according to a phase difference between a subcarrier received by each of the two or more antennas, wherein the subcarrier is configured to carry a signal sent by the second wireless communication device, and the subcarrier is at least one of a plurality of subcarriers; and determining the number of identifiable ones of signal transmission paths with the second wireless communication device;

wherein the determining the relative position of the second wireless communication device according to the phase difference between the subcarrier received by the two or more antennas comprises:

obtaining channel state information of the plurality of subcarriers received by the two or more antennas; and when the number of identifiable ones of the signal transmission paths is less than a preset number, determining an angle of the second wireless communication device relative to the first wireless communication device according to the phase difference of the channel state information of the subcarrier received by the two or more antennas; and wherein when the first wireless communication device and the second wireless communication device support sounding frame interaction, the obtaining the channel state information of the plurality of subcarriers received by the two or more antennas comprises:

for each antenna of the first wireless communication device, sending a null data packet, NDP, frame to the second wireless communication device through the antenna;

receiving a sounding response frame sent by the second wireless communication device, wherein the sounding response frame is sent by the second wireless communication device after receiving the NDP frame and performing a channel evaluation according to the NDP frame, and the sounding response frame comprises channel evaluation H values of the plurality of subcarriers after being compressed; and decompressing the sounding response frame to obtain the channel evaluation H values of the plurality of subcarriers received by the antenna.

2. The method according to claim 1, further comprising:

when the number of identifiable ones of the signal transmission paths is greater than the preset number, determining the angle and a distance of the second wireless communication device relative to the first wireless communication device according to the phase difference of the channel state information of the subcarrier received by the two or more antennas and the signal transmission paths.

3. The method according to claim 1, wherein, when at least one of the first wireless communication device or the second wireless communication device does not support sounding frame interaction, the obtaining the channel state information of the plurality of subcarriers received by the two or more antennas comprises:

for each antenna of the first wireless communication device, receiving a multi-carrier modulated signal sent by the second wireless communication device through the antenna; and performing a channel evaluation according to the multi-carrier modulated signal to obtain channel evaluation H values of the plurality of subcarriers received by the antenna.

4. The method according to claim 3, further comprising:

determining whether an angle of the first wireless communication device on a plane of an X axis and a Z axis is zero; and when the angle of the first wireless communication device on the plane of the X axis and the Z axis is not zero, correcting the channel evaluation H value of each subcarrier according to the angle of the first wireless communication device on the plane of the X axis and the Z axis.

5. The method according to claim 4, wherein, when the number of identifiable ones of the signal transmission paths is less than the preset number, the determining the angle of the second wireless communication device relative to the first wireless communication device according to the phase difference of the channel state information of the subcarrier received by the two or more antennas comprises:

when the number of identifiable ones of the signal transmission paths is less than the preset number, for each subcarrier of the plurality of subcarriers, determining the phase difference between the channel evaluation H values of the subcarriers of the two or more antennas;

determining an angle value of the subcarrier according to the phase difference;

traversing the plurality of subcarriers to obtain the angle values of the plurality of subcarriers; and in response to that an interval threshold of the phase difference of the plurality of subcarriers is obtained from a historical library, matching the angle values of the plurality of subcarriers with the interval threshold of the phase difference to obtain an angle of the second wireless communication device on a plane of the X axis and a Y axis relative to the first wireless communication device.

6. The method according to claim 5, further comprising:

obtaining an average value of the angle values of the plurality of subcarriers, in response to that the interval threshold of the phase difference of the plurality of subcarriers is not obtained from the historical library; and determining the average value as the angle of the second wireless communication device on the plane of the X axis and the Y axis relative to the first wireless communication device.

7. The method according to claim 4, wherein, in case that the number of identifiable ones of the signal transmission paths is greater than the preset number, the determining the angle and the distance of the second wireless communication device relative to the first wireless communication device according to the phase difference of the channel state information of the subcarrier received the by the two or more antennas and the signal transmission paths comprises:

when the number of identifiable ones of the signal transmission paths is greater than the preset number, for each subcarrier of the plurality of subcarriers, listing an equation for the subcarrier according to the phase difference between the channel evaluation H values of the subcarriers of the two or more antennas and the signal transmission paths;

traversing the plurality of subcarriers to obtain the equations for the plurality of subcarriers;

processing the equations for the plurality of subcarriers to obtain the signal transmission path with the smallest time of flight; and determining an angle and a path length of the signal transmission path with the smallest time of flight as the angle and the distance of the second wireless communication device on the plane of the X axis and the Y axis relative to the first wireless communication device.

8. The method according to claim 7, wherein the processing the equations for the plurality of subcarriers comprises:

obtaining the number of the signal transmission paths;

obtaining the number of unknown variables according to the number of the signal transmission paths, the number of antennas of the first wireless communication device, and the number of the plurality of subcarriers;

grouping the equations for the plurality of subcarriers according to the number of unknown variables, to obtain a plurality of equation sets; and performing merge processing on the unknown variables of the plurality of equation sets, the merge processing including one or more of mean, variance, covariance, and mean square deviation processing.

9. The method according to claim 5, further comprising:

obtaining the angle of the first wireless communication device on the plane of the X axis and the Z axis;

determining an orientation of the second wireless communication device in a three-dimensional space of the X axis, the Y axis and the Z axis relative to the first wireless communication device, according to the angle of the first wireless communication device on the plane of the X axis and the Z axis and at least one of the angle or the distance of the second wireless communication device in the plane of the X axis and the Y axis relative to the first wireless communication device.

10. The method according to claim 9, further comprising:

displaying relative position information on a screen, wherein the relative position information comprises one or more of: the angle of the second wireless communication device on the plane of the X axis and the Y axis relative to the first wireless communication device, the distance of the second wireless communication device on the plane of the X axis and the Y axis relative to the first wireless communication device, and the orientation of the second wireless communication device in the three-dimensional space of the X axis, the Y axis and the Z axis relative to the first wireless communication device.

11. The method according to claim 9, further comprising:

sending the relative position information to the second wireless communication device, wherein the relative position information comprises one or more of: the angle of the second wireless communication device on the plane of the X axis and the Y axis relative to the first wireless communication device, the distance of the second wireless communication device on the plane of the X axis and the Y axis relative to the first wireless communication device, and the orientation of the second wireless communication device in the three-dimensional space of the X axis, the Y axis and the Z axis relative to the first wireless communication device.

12. A communication device, comprising:

a transceiver;

a memory; and a processor connected with the transceiver and the memory respectively, and configured to control wireless signal transmission and reception of the transceiver by executing computer- executable instructions on the memory, wherein the processor is further configured to:

determine a relative position of a second wireless communication device according to a phase difference between a subcarrier received by each of two or more antennas of a first wireless communication device, wherein the subcarrier is configured to carry a signal sent by the second wireless communication device, and the subcarrier is at least one of a plurality of subcarriers; and determine the number of identifiable ones of signal transmission paths with the second wireless communication device;

wherein determining the relative position of the second wireless communication device according to the phase difference between the subcarrier received by the two or more antennas comprises:

obtaining channel state information of the plurality of subcarriers received by the two or more antennas; and when the number of identifiable ones of the signal transmission paths is less than a preset number, determining an angle of the second wireless communication device relative to the first wireless communication device according to the phase difference of the channel state information of the subcarrier received by the two or more antennas; and wherein when the first wireless communication device and the second wireless communication device support sounding frame interaction, the obtaining the channel state information of the plurality of subcarriers received by the two or more antennas comprises:

for each antenna of the first wireless communication device, sending a null data packet, NDP, frame to the second wireless communication device through the antenna;

receiving a sounding response frame sent by the second wireless communication device, wherein the sounding response frame is sent by the second wireless communication device after receiving the NDP frame and performing a channel evaluation according to the NDP frame, and the sounding response frame comprises channel evaluation H values of the plurality of subcarriers after being compressed; and decompressing the sounding response frame to obtain the channel evaluation H values of the plurality of subcarriers received by the antenna.

13. A non-transitory computer-readable storage medium stored with computer instructions, wherein the computer instructions are configured to enable a computer to:

determine a relative position of a second wireless communication device according to a phase difference between a subcarrier received by each of two or more antennas of a first wireless communication device, wherein the subcarrier is configured to carry a signal sent by the second wireless communication device, and the subcarrier is at least one of a plurality of subcarriers; and determine the number of identifiable ones of signal transmission paths with the second wireless communication device;

wherein determining the relative position of the second wireless communication device according to the phase difference between the subcarrier received by the two or more antennas comprises:

obtaining channel state information of the plurality of subcarriers received by the two or more antennas; and when the number of identifiable ones of the signal transmission paths is less than a preset number, determining an angle of the second wireless communication device relative to the first wireless communication device according to the phase difference of the channel state information of the subcarrier received by the two or more antennas; and wherein when the first wireless communication device and the second wireless communication device support sounding frame interaction, the obtaining the channel state information of the plurality of subcarriers received by the two or more antennas comprises:

for each antenna of the first wireless communication device, sending a null data packet, NDP, frame to the second wireless communication device through the antenna;

receiving a sounding response frame sent by the second wireless communication device, wherein the sounding response frame is sent by the second wireless communication device after receiving the NDP frame and performing a channel evaluation according to the NDP frame, and the sounding response frame comprises channel evaluation H values of the plurality of subcarriers after being compressed; and decompressing the sounding response frame to obtain the channel evaluation H values of the plurality of subcarriers received by the antenna.

14. A wireless communication system, comprising a first wireless communication device and a second wireless communication device, wherein the first wireless communication device is configured to perform the method according to claim 1.

* * * * *